United States Patent
Suzuki

(10) Patent No.: US 7,707,874 B2
(45) Date of Patent: May 4, 2010

(54) MISFIRE DETERMINATION DEVICE AND METHOD FOR INTERNAL COMBUSTION ENGINE, AND VEHICLE INCLUDING MISFIRE DETERMINATION DEVICE

(75) Inventor: Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 15 days.

(21) Appl. No.: 12/325,717

(22) Filed: Dec. 1, 2008

(65) Prior Publication Data

US 2009/0145210 A1 Jun. 11, 2009

(30) Foreign Application Priority Data

Dec. 11, 2007 (JP) ............................. 2007-319329
Jul. 24, 2008 (JP) ............................. 2008-191398

(51) Int. Cl.
*G01M 15/11* (2006.01)
(52) U.S. Cl. .................................................. 73/114.04
(58) Field of Classification Search .............. 73/114.02, 73/114.04, 114.05, 114.11
See application file for complete search history.

(56) References Cited

U.S. PATENT DOCUMENTS

| | | | | |
|---|---|---|---|---|
| 6,298,717 B1 * | 10/2001 | Nishimura | ............... | 73/114.04 |
| 6,732,708 B2 * | 5/2004 | Nishizawa et al. | ..... | 123/406.13 |
| 6,962,224 B2 * | 11/2005 | Nakanowatari | ........ | 180/65.225 |
| 7,503,207 B2 * | 3/2009 | Nishigaki et al. | ........ | 73/114.02 |
| 7,503,208 B2 * | 3/2009 | Akimoto et al. | .......... | 73/114.03 |
| 7,536,902 B2 * | 5/2009 | Tsukamoto et al. | ....... | 73/114.04 |
| 7,543,483 B2 * | 6/2009 | Akimoto et al. | .......... | 73/114.03 |
| 2003/0173123 A1 * | 9/2003 | Nakanowatari | ............ | 180/65.2 |
| 2007/0101806 A1 * | 5/2007 | Yamaguchi | ................. | 73/117.3 |
| 2007/0261484 A1 * | 11/2007 | Nishigaki et al. | ........... | 73/117.3 |
| 2008/0148835 A1 * | 6/2008 | Akimoto et al. | .......... | 73/116.01 |
| 2008/0196485 A1 * | 8/2008 | Akimoto et al. | .......... | 73/114.02 |
| 2009/0151469 A1 * | 6/2009 | Suzuki | ........................ | 73/847 |
| 2009/0308145 A1 * | 12/2009 | Suzuki | .................... | 73/114.04 |

FOREIGN PATENT DOCUMENTS

JP 2001-065402 A 3/2001

* cited by examiner

*Primary Examiner*—Lisa M Caputo
*Assistant Examiner*—Freddie Kirkland, III
(74) *Attorney, Agent, or Firm*—Kenyon & Kenyon LLP

(57) ABSTRACT

A misfire determination device for a multi-cylinder internal combustion engine, of which an output shaft is connected, through a torsion element, to a downstream shaft downstream of the torsion element, includes: an first portion for detecting an output shaft rotational speed that is the rotational speed of the output shaft; a second portion for detecting a downstream shaft rotational speed that is the rotational speed of the downstream shaft; a third portion that calculates a component caused by an influence of resonance due to torsion of the torsion element on the output shaft rotational speed, based on the acquired output shaft rotational speed and the acquired downstream shaft rotational speed; and a fourth portion for determining the occurrence of the misfire in the internal combustion engine based on a rotational speed that is obtained by subtracting the calculated component from the detected output shaft rotational speed.

17 Claims, 11 Drawing Sheets

FIG. 4

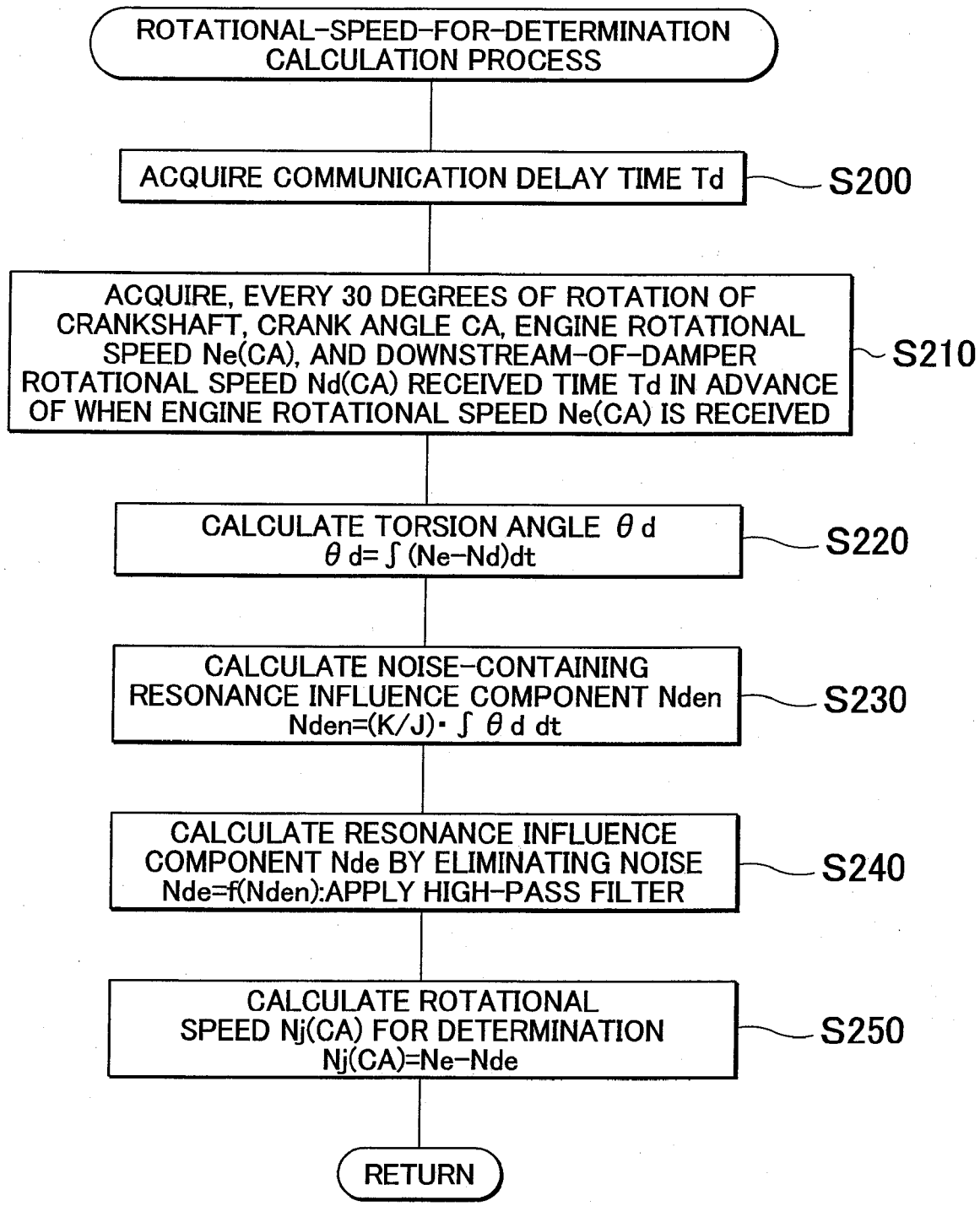

ROTATIONAL-SPEED-FOR-DETERMINATION CALCULATION PROCESS

S200 — ACQUIRE COMMUNICATION DELAY TIME Td

S210 — ACQUIRE, EVERY 30 DEGREES OF ROTATION OF CRANKSHAFT, CRANK ANGLE CA, ENGINE ROTATIONAL SPEED Ne(CA), AND DOWNSTREAM-OF-DAMPER ROTATIONAL SPEED Nd(CA) RECEIVED TIME Td IN ADVANCE OF WHEN ENGINE ROTATIONAL SPEED Ne(CA) IS RECEIVED

S220 — CALCULATE TORSION ANGLE $\theta d$
$\theta d = \int (Ne-Nd)dt$

S230 — CALCULATE NOISE-CONTAINING RESONANCE INFLUENCE COMPONENT Nden
$Nden = (K/J) \cdot \int \theta d \, dt$ S240 — CALCULATE RESONANCE INFLUENCE COMPONENT Nde BY ELIMINATING NOISE
$Nde = f(Nden)$: APPLY HIGH-PASS FILTER S250 — CALCULATE ROTATIONAL SPEED Nj(CA) FOR DETERMINATION
$Nj(CA) = Ne - Nde$

RETURN

MISFIRE DETERMINATION DEVICE AND METHOD FOR INTERNAL COMBUSTION ENGINE, AND VEHICLE INCLUDING MISFIRE DETERMINATION DEVICE

INCORPORATION BY REFERENCE

The disclosures of Japanese Patent Application No. 2007-319329 filed on Dec. 11, 2007 and Japanese Patent Application No. 2008-191398 filed on Jul. 24, 2008 including the specifications, drawings and abstracts are incorporated herein by reference in their entirety.

BACKGROUND OF THE INVENTION

1. Field of the Invention

The invention relates to an internal-combustion-engine misfire determination device and method, and to a vehicle including the device, and more specifically, to an internal-combustion-engine misfire determination device and method that determine the occurrence of a misfire in a multi-cylinder internal combustion engine, of which an output shaft is connected, through a torsion element, to a downstream shaft downstream of the torsion element, and to a vehicle including such a misfire determination device.

2. Description of the Related Art

As this kind of misfire determination device, a device has been proposed that, in a vehicle in which vibration control is performed using an electric motor so as to cancel variation in torque of a crankshaft of an engine, calculates the amount of correction of torque by which the torque output from the electric motor for vibration control using the electric motor is corrected, and detects misfires in the engine based on the amount of correction of torque output from the electric motor (see Japanese Patent Application Publication No. 2001-65402 (JP-A-2001-65402), for example).

In a system installed in a vehicle in which the crankshaft of the engine is connected to the downstream side through a torsion element, such as a damper, variation in torque of the crankshaft due to explosive combustion in the engine induces resonance of the torsion element and the downstream components including the torsion element, and the resonance causes variation in rotation of the crankshaft. As a result, even when it is tried to detect the occurrence of a misfire in one of the cylinders of the engine based on the variation in rotation of the crankshaft, the occurrence of a misfire cannot be accurately detected. When vibration control against variation in torque of the crankshaft of the engine is performed using an electric motor, resonance of the torsion element and the downstream components including the torsion element may be induced, and in this case, the accuracy in detecting the occurrence of a misfire in one of the cylinders of the engine is further reduced.

SUMMARY OF THE INVENTION

The invention provides an internal-combustion-engine misfire determination device and method that determine the occurrence of a misfire in a multi-cylinder internal combustion engine, of which an output shaft is connected, through a torsion element, to a downstream shaft downstream of the torsion element, and provides a vehicle including the device.

A first aspect of the invention relates to an internal-combustion-engine misfire determination device for determining an occurrence of a misfire in a multi-cylinder internal combustion engine, of which an output shaft is connected, through a torsion element, to a downstream shaft downstream of the torsion element. The internal-combustion-engine misfire determination device includes: an output-shaft rotational speed detection portion for detecting an output shaft rotational speed that is the rotational speed of the output shaft; a downstream shaft rotational speed detection portion for detecting a downstream shaft rotational speed that is the rotational speed of the downstream shaft; a resonance influence component calculation portion that is configured to acquire the detected output shaft rotational speed and the detected downstream shaft rotational speed, and that calculates a resonance influence component that is the component caused by an influence of resonance due to torsion of the torsion element on the output shaft rotational speed, based on the detected output shaft rotational speed and the detected downstream shaft rotational speed; and a misfire determination portion for determining the occurrence of the misfire in the internal combustion engine based on a rotational speed for determination that is obtained by subtracting the calculated resonance influence component from the detected output shaft rotational speed.

With the above configuration, it is possible to accurately determine the occurrence of a misfire in the internal combustion engine based on the output shaft rotational speed and the downstream shaft rotational speed even when the resonance due to torsion of the torsion element occurs.

In the internal-combustion-engine misfire determination device according to this aspect, the resonance influence component calculation portion may be configured to perform at least one of acquisition of the detected output shaft rotational speed and acquisition of the detected downstream shaft rotational speed via communication, extract a frequency component caused by the resonance from the acquired output shaft rotational speed, and a frequency component caused by the resonance from the acquired downstream shaft rotational speed, estimate a delay time due to the communication based on a phase difference between the extracted frequency components and the acquired output shaft rotational speed, perform the acquisitions of the output shaft rotational speed and the downstream shaft rotational speed between which a time interval corresponding to the estimated delay time due to the communication is interposed, and calculate the resonance influence component caused by the influence of the resonance on the output shaft rotational speed, based on the output shaft rotational speed and the downstream shaft rotational speed of which the acquisitions are performed with the time interval interposed therebetween. With the above configuration, when at least one of the output shaft rotational speed and the downstream shaft rotational speed is acquired via communication, it is possible to reduce the influence of the delay due to the communication on the accuracy in determining the occurrence of a misfire in the internal combustion engine based on the output shaft rotational speed and the downstream shaft rotational speed.

In the internal-combustion-engine misfire determination device according to this aspect, the resonance influence component calculation portion may estimate the delay time due to the communication in such a manner that the delay time is estimated to be longer as timing of ignition by an ignition device capable of performing ignitions independently in each of cylinders of the internal combustion engine is retarded. With the above configuration, it is possible to more properly estimate the delay time due to the communication.

In the internal-combustion-engine misfire determination device according to this aspect, the resonance influence component calculation portion may extract, as the frequency component caused by the resonance, a frequency component whose frequency is once per two rotations of the output shaft of the internal combustion engine.

In the internal-combustion-engine misfire determination device according to this aspect, the resonance influence component calculation portion may extract the frequency component, caused by the resonance, by applying a filtering process that does not attenuate the frequency component caused by the resonance but attenuates bands other than the resonance frequency. With the above configuration, it is possible to more accurately estimate the delay time due to communication because it is possible to detect the phase difference with the use of the resonance frequency components of the output shaft rotational speed and the downstream shaft rotational speed only.

In the internal-combustion-engine misfire determination device according to this aspect, the filtering process may be a process using a band-pass filter.

In the internal-combustion-engine misfire determination device according to this aspect, the resonance influence component calculation portion may estimate the delay time due to the communication based on an after-smoothing phase difference obtained by smoothing the phase difference between both the extracted frequency components. With the above configuration, the misfire determination device works even when the internal combustion engine is in a transitional state.

In the internal-combustion-engine misfire determination device, the downstream shaft rotational speed detection portion may output the calculated downstream shaft rotational speed to the resonance influence component calculation portion via communication, and the resonance influence component calculation portion may directly acquire the output shaft rotational speed detected by the output shaft rotational speed detection portion without the communication, and acquire the downstream shaft rotational speed detected by the downstream shaft rotational speed detection portion via the communication.

In the internal-combustion-engine misfire determination device according to this aspect, the resonance influence component calculation portion may estimate the delay time due to the communication based on combustion conditions in the internal combustion engine.

In the internal-combustion-engine misfire determination device according to this aspect, the resonance influence component calculation portion may calculate a torsion angle of the torsion element based on the acquired output shaft rotational speed and the acquired downstream shaft rotational speed, and calculate the resonance influence component based on the calculated torsion angle, a spring constant of the torsion element, and a moment of inertia on the internal combustion engine side of the torsion element. The resonance influence component calculation portion may calculate the torsion angle by integrating a value obtained by subtracting the acquired downstream shaft rotational speed from the acquired output shaft rotational speed, and calculate the resonance influence component by integrating a product of the torsion angle and a constant ratio between the spring constant and the moment of inertia.

A second aspect of the invention relates to a vehicle including a multi-cylinder internal combustion engine, of which an output shaft is connected, through a torsion element, to a downstream shaft downstream of the torsion element. The vehicle further includes an output-shaft rotational speed detection means for detecting an output shaft rotational speed that is the rotational speed of the output shaft; a downstream shaft rotational speed detection means for detecting a downstream shaft rotational speed that is the rotational speed of the downstream shaft; a resonance influence component calculation means that is configured to perform acquisition of the detected output shaft rotational speed and acquisition of the detected downstream shaft rotational speed, and calculates the resonance influence component caused by the influence of the resonance on the output shaft rotational speed, based on the acquired output shaft rotational speed and the acquired downstream shaft rotational speed; and a misfire determination means for determining the occurrence of the misfire in the internal combustion engine based on a rotational speed for determination that is obtained by subtracting the calculated resonance influence component from the detected output shaft rotational speed.

The above configuration also brings about the effects brought about by the above internal-combustion-engine misfire determination device, that is, it is possible to accurately determine the occurrence of a misfire in the internal combustion engine even when resonance due to torsion of the torsion element occurs, and it is also possible to reduce the influence of the delay due to communication on the accuracy in determining the occurrence of a misfire in the internal combustion engine based on the output shaft rotational speed and the downstream shaft rotational speed when at least one of the output shaft rotational speed and the downstream side shaft rotational speed is acquired via the communication.

The vehicle according to this aspect may further include an electric motor that outputs mechanical power to the downstream-side shaft downstream of the torsion element, and the downstream shaft rotational speed detection portion may detect an electric motor rotational speed that is the rotational speed of the electric motor, and convert the detected electric motor rotational speed to obtain the downstream shaft rotational speed. With the above configuration, it is possible to use the high precision sensor for detecting the rotational speed of the electric motor as the downstream shaft rotational speed detection portion. In addition, it is possible to accurately determine the occurrence of a misfire in the internal combustion engine even when vibration control for controlling the vibration caused by the variation in torque on the axle side is performed using the electric motor.

The vehicle according to this aspect may further include an electric power/mechanical power input/output device that is connected to the downstream-side shaft and an axle and that receives and outputs mechanical power from and to the downstream-side shaft and the axle side, which involves input and output of electric power and mechanical power to and from the electric power/mechanical power input/output device. The electric motor may be connected to the axle side so as to be able to output mechanical power to the axle side. The downstream-side shaft rotational speed detection portion may detect a drive state in which the electric power/mechanical power input/output device is driven, and perform a calculation based on the detected electric motor rotational speed and the detected drive state to detect the downstream-side shaft rotational speed. With the above configuration, it is possible to accurately determine the occurrence of a misfire in the internal combustion engine even when vibration control for controlling the vibration caused by the variation in torque on the axle side is performed using the electric power/mechanical power input/output device.

A third aspect of the invention relates to an internal-combustion-engine misfire determination method of determining an occurrence of a misfire in a multi-cylinder internal combustion engine, of which an output shaft is connected, through a torsion element, to a downstream shaft downstream of the torsion element. The internal-combustion-engine misfire determination method includes: detecting an output shaft rotational speed that is the rotational speed of the output shaft;

detecting a downstream shaft rotational speed that is the rotational speed of the downstream shaft; calculating a resonance influence component that is the component caused by an influence of resonance due to torsion of the torsion element on the output shaft rotational speed, based on the detected output shaft rotational speed and the detected downstream shaft rotational speed; and determining the occurrence of the misfire in the internal combustion engine based on a rotational speed for determination that is obtained by subtracting the calculated resonance influence component from the detected output shaft rotational speed.

The internal-combustion-engine misfire determination method according to this aspect may include acquiring the detected output shaft rotational speed and the detected downstream shaft rotational speed via communication; extracting a frequency component caused by the resonance from the acquired output shaft rotational speed; extracting a frequency component caused by the resonance from the acquired downstream shaft rotational speed; estimating a delay time due to the communication based on a phase difference between the extracted frequency components and the acquired output shaft rotational speed; performing acquisition of the output shaft rotational speed and acquisition of the downstream shaft rotational speed between which a time interval corresponding to the estimated delay time due to the communication is interposed; and calculating the resonance influence component that is the component caused by the influence of the resonance on the output shaft rotational speed, based on the output shaft rotational speed and the downstream shaft rotational speed of which the acquisitions are performed with the time interval interposed therebetween.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a flow chart showing an example of a rotational-speed-for-determination calculation process performed by the engine ECU 24 according to the embodiment of the invention;

DETAILED DESCRIPTION OF EMBODIMENTS

Modes for carrying out the invention will be described below using embodiments.

Figure 1:
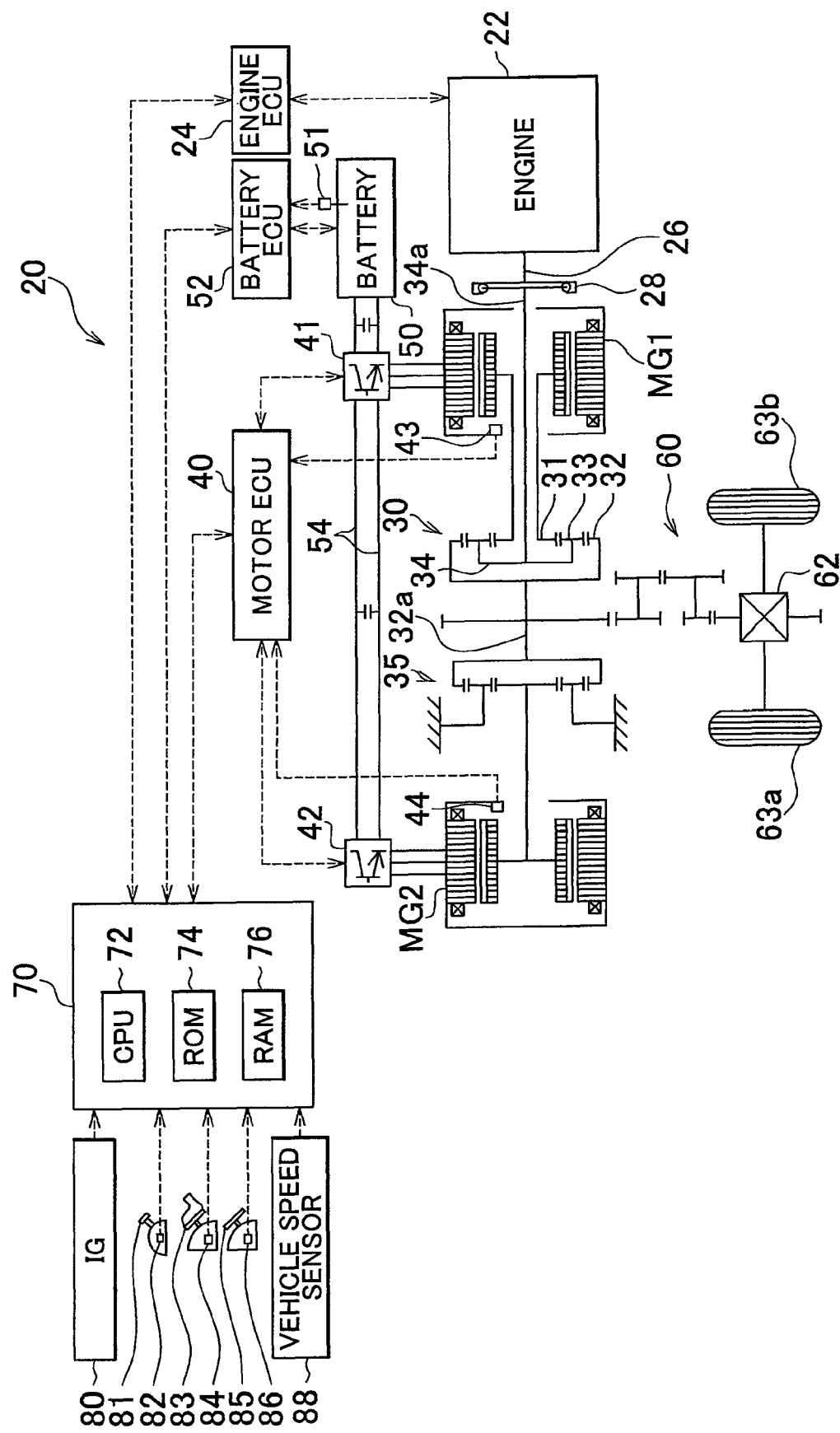
FIG. 1 is a configuration diagram showing an outline of a configuration of a hybrid car 20 in which an internal-combustion-engine misfire determination device according to an embodiment of the invention is installed.

FIG. 1 is a configuration diagram showing an outline of a configuration of a hybrid car 20 in which an internal-combustion-engine misfire determination device is installed, according to an embodiment of the invention. As shown in FIG. 1, the hybrid car 20 of this embodiment includes: an engine 22, a three-axis power distribution/integration mechanism 30 that is connected to a crankshaft 26, which serves as an output shaft of the engine 22, through a damper 28, which serves as a torsion element; a motor MG1 capable of generating electricity that is connected to the power distribution/integration mechanism 30; a speed reduction gear 35 fixed to a ring gear shaft 32a that is connected to the power distribution/integration mechanism 30; a motor MG2 connected to the speed reduction gear 35; and an electronic control unit 70 for a hybrid system (hereinafter referred to as the hybrid ECU 70), which controls the whole vehicle. An electronic control unit 24 for an engine, which mainly controls the engine 22, a crank position sensor 140, which detects the rotational position of the crankshaft 26 of the engine 22, described later, and rotational position detection sensors 43, 44, which detect the rotational positions of the motors MG1, MG2, function as the misfire determination device for an internal combustion engine of this embodiment.

Figure 2:
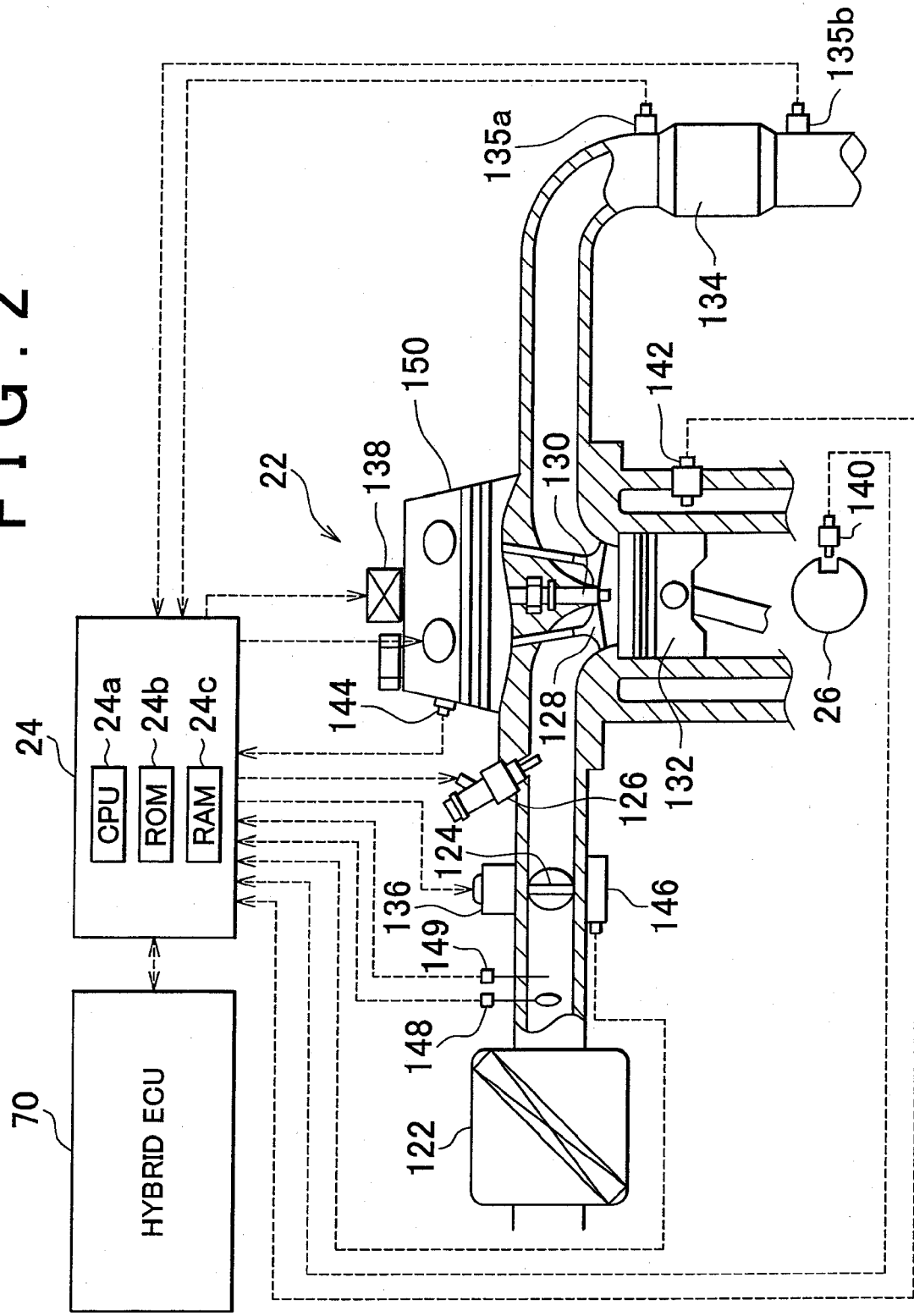
FIG. 2 is a configuration diagram showing an outline of a configuration of an engine 22 according to the embodiment of the invention.

The engine 22 is an eight-cylinder internal combustion engine capable of outputting mechanical power using hydrocarbon fuel, such as gasoline or light oil, for example. As shown in FIG. 2, in the engine 22, air cleaned by an air cleaner 122 is taken in through a throttle valve 124, the intake air and gasoline are mixed by injecting gasoline from a fuel injection valve 126 provided for each cylinder, the mixture is taken into a combustion chamber through an intake valve 128 and explosively combusted by the electric spark of an ignition plug 130, and the reciprocation motion of a piston 132 that is pushed down by the energy of the combustion is converted into the rotational motion of the crankshaft 26. The exhaust gas from the engine 22 is discharged into the outside through a purification device (three-way catalyst) 134 that removes harmful components, such as carbon monoxide (CO), hydrocarbon (HC), and nitrogen oxide (NOx).

The engine 22 is controlled by the electronic control unit 24 for an engine (hereinafter, referred to as the engine ECU 24). The engine ECU 24 is a microprocessor including a CPU 24a as a main component, and includes, in addition to the CPU

24a, a ROM 24b for storing processing programs, a RAM 24c for temporarily storing data, and input and output ports and a communication port (not shown). Supplied to the engine ECU 24 through the input port are signals from various sensors for detecting status values of the engine 22, that is, a signal indicating the crank position (crank angle CA) from the crank position sensor 140 for detecting the rotational position (crank angle CA) of the crankshaft 26, a signal indicating the coolant temperature from a coolant temperature sensor 142 for detecting the temperature of coolant of the engine 22, a signal indicating the cam position from a cam position sensor 144 for detecting the rotational position of a cam shaft for opening/closing the intake valve 128 and exhaust valve 130 for taking and discharging gas into and from the combustion chamber, a signal indicating the throttle position from a throttle valve position sensor 146 for detecting the position of the throttle valve 124, a signal indicating the intake air amount Q from an air flow meter 148 that is attached in an intake pipe, a signal indicating the temperature of the intake air from a temperature sensor 149 that is also attached in the intake pipe, a signal indicating the air/fuel ratio AF from an air/fuel ratio sensor 135a, and a signal indicating oxygen concentration from an oxygen sensor 135b. In addition, output from the engine ECU 24 through the output port are various control signals for driving the engine 22, that is, for example, a drive signal to be sent to the fuel injection valve 126, a drive signal to be sent to a throttle motor 136 for adjusting the position of the throttle valve 124, a control signal to be sent to an ignition coil 138 that is integrated with an igniter, and a control signal to be sent to a variable valve timing mechanism 150 capable of varying the open/close timing of the intake valve 128. The engine ECU 24 communicates with the hybrid ECU 70, and controls the operation of the engine 22 using control signals from the hybrid ECU 70, and at the same time, outputs data concerning the operational status of the engine 22 as needed. The above-described crank position sensor 140 is an electromagnetic pickup sensor having a timing rotor that is fixed so as to rotate in synchronization with the crankshaft 26 and in which teeth are formed at ten-degree intervals and a void corresponding to two teeth is created for detecting the reference position. The crank position sensor 140 generates a shaped wave every time the crankshaft 26 rotates 10 degrees. The engine ECU 24 calculates, as a rotational speed Ne of the engine 22, the rotational speed during each 30-degree rotation of the crankshaft 26 based on the shaped wave received from the crank position sensor 140.

The power distribution/integration mechanism 30 includes a sun gear 31 that is an external gear, a ring gear 32 that is an internal gear arranged concentrically with the sun gear 31, a plurality of pinion gears 33 that mesh with the sun gear 31 and the ring gear 32, and a carrier 34 that rotatably and revolvably supports the plurality of pinion gears 33. The power distribution/integration mechanism 30 is thus constructed in the form of a planetary gear mechanism that effects differential operation in which the sun gear 31, the ring gear 32 and the carrier 34 are used as rotary elements. In the power distribution/integration mechanism 30, the crankshaft 26 of the engine 22 is connected, through the damper 28, to a carrier shaft 34a that is connected to the carrier 34, the motor MG1 is connected to the sun gear 31, and the speed reduction gear 35 is connected to the ring gear 32 through the ring gear shaft 32a. The power distribution/integration mechanism 30 distributes the mechanical power that is input from the engine 22 through the carrier 34 to the sun gear 31 side and the ring gear 32 side according to the gear ratio when the motor MG1 functions as an electric generator, and on the other hand, the power distribution/integration mechanism 30 integrates the mechanical power that is input from the engine 22 through the carrier 34 and the mechanical power that is input from the motor MG1 through the sun gear 31 and outputs the integrated mechanical power to the ring gear 32 side when the motor MG1 functions as an electric motor. The mechanical power output to the ring gear 32 is ultimately output from the ring gear shaft 32a to driving wheels 63a, 63b of the vehicle through a gear mechanism 60 and a differential gear 62.

The motors MG1 and MG2 are known synchronous generator/motors that operate as electric generators and electric motors, and exchange electric power with a battery 50 through inverters 41, 42. Electric power lines 54 that connect the battery 50 and the inverters 41, 42 are a positive bus and a negative bus that are shared by the inverters 41, 42, so that another motor can use the electric power generated by one of the motor MG1 and the motor MG2. Thus, the battery 50 is charged by the electric power generated by the motor MG1 or the motor MG2 or discharged due to a shortage of electric power. When the input and output of electric power between the motors MG1, MG2 are balanced, the battery 50 is neither charged nor discharged. Driving of the motor MG1 and driving of the motor MG2 are both controlled by an electronic control unit 40 for motors (hereinafter, referred to as the motor ECU 40). Supplied to the motor ECU 40 are signals required to control driving of the motors MG1, MG2, that is, for example, signals from the rotational position detection sensors 43, 44 for detecting the rotational positions of the rotors of the motors MG1, MG2, and signals indicating the phase currents applied to the motors MG1, MG2 that are detected by current sensors (not shown). Switching control signals are output from the motor ECU 40 to the inverters 41, 42. The motor ECU 40 communicates with the hybrid ECU 70, and controls driving of the motors MG1, MG2 using control signals from the hybrid ECU 70, and at the same time, outputs data concerning the operational status of the motors MG1, MG2 to the hybrid ECU 70 as needed. The rotational position detection sensors 43, 44 each include a resolver. The motor ECU 40 calculates the rotational speeds Nm1, Nm2 of the motors MG1, MG2 every predetermined time period (every 50 μs or every 100 μs, for example) based on the signals from the rotational position detection sensors 43, 44.

The battery 50 is controlled by the electronic control unit 52 for a battery (hereinafter, referred to as the battery ECU 52). Supplied to the battery ECU 52 are signals required to control the battery 50, that is, a signal indicating the voltage across terminals of the battery 50 that is output from a voltage sensor (not shown) placed between the terminals of the battery 50, a signal indicating the charging/discharging electric current that is output from a current sensor (not shown) attached to one of the electric power lines 54 connected to the output terminals of the battery 50, and a signal indicating the battery temperature Tb that is output from a temperature sensor 51 attached to the battery 50. The battery ECU 52 outputs data concerning conditions of the battery 50 to the hybrid ECU 70 via communication as needed. The battery ECU 52 also calculates the state of charge (SOC) based on the integral value of the charging/discharging electric current that is detected by the current sensor in order to control the battery 50.

The engine ECU 70 is a microprocessor including a CPU 72 as a main component, and includes, in addition to the CPU 72, a ROM 74 for storing processing programs, a RAM 76 for temporarily storing data, and input and output ports and a communication port (not shown). Supplied to the hybrid ECU 70 through the input port are an ignition signal from an ignition switch 80, a signal indicating the shift position SP from a shift position sensor 82 that detects the position of a shift lever 81, a signal indicating the accelerator pedal operation amount Acc from an acceleration pedal position sensor 84 that detects the amount of depression of an accelerator pedal 83, a signal indicating the brake pedal position BP from a brake pedal position sensor 86 that detects the amount of depression of a brake pedal 85, and a signal indicating the vehicle speed V from a vehicle speed sensor 88. The hybrid ECU 70 is connected to the engine ECU 24, the motor ECU 40, and the battery ECU 52 via the communication port, and exchanges various control signals and data with the engine ECU 24, the motor ECU 40, and the battery ECU 52. In this embodiment, the communication between the ECUs is performed using a communication protocol called Controller Area Network (CAN). According to CAN, data is transmitted/received in units called frames, and an ID number determining the priority is assigned to each frame, and the ECUs determine whether to receive the data based on the ID.

In the hybrid car 20 of the embodiment constructed as described above, the required torque that should be output to the ring gear shaft 32a is calculated based on the accelerator pedal operation amount Acc corresponding to the amount of depression of the accelerator pedal 83 by a driver and on the vehicle speed V, and operation of the engine 22, operation of the motor MG1, and operation of the motor MG2 are controlled such that the required mechanical power corresponding to the required torque is output to the ring gear shaft 32a. Modes for controlling operation of the engine 22, the motor MG1, and the motor MG2 include: a torque conversion operation mode in which operation of the engine 22 is controlled such that the mechanical power that fulfills the required mechanical power is output from the engine 22, operation of the motor MG1 and operation of the motor MG2 are controlled such that all the mechanical power output from the engine 22 is subjected to the torque conversion performed by the power distribution/integration mechanism 30, the motor MG1, and the motor MG2 and is output to the ring gear shaft 32a; a charge/discharge operation mode in which operation of the engine 22 is controlled so as to output a mechanical power corresponding to the sum of the required mechanical power and the electric power needed for charging/discharging of the battery 50, and operation of the motor MG1 and operation of the motor MG2 are controlled such that all of or part of the mechanical power output from the engine 22 is subjected to the torque conversion performed by the power distribution/integration mechanism 30, the motor MG1 and the motor MG2, and the required mechanical power is output to the ring gear shaft 32a, which involves charging/discharging of the battery 50; and a motor operation mode in which operation control is performed such that operation of the engine 22 is stopped and the mechanical power corresponding to the required mechanical power is output from the motor MG2 to the ring gear shaft 32a.

Figure 3:
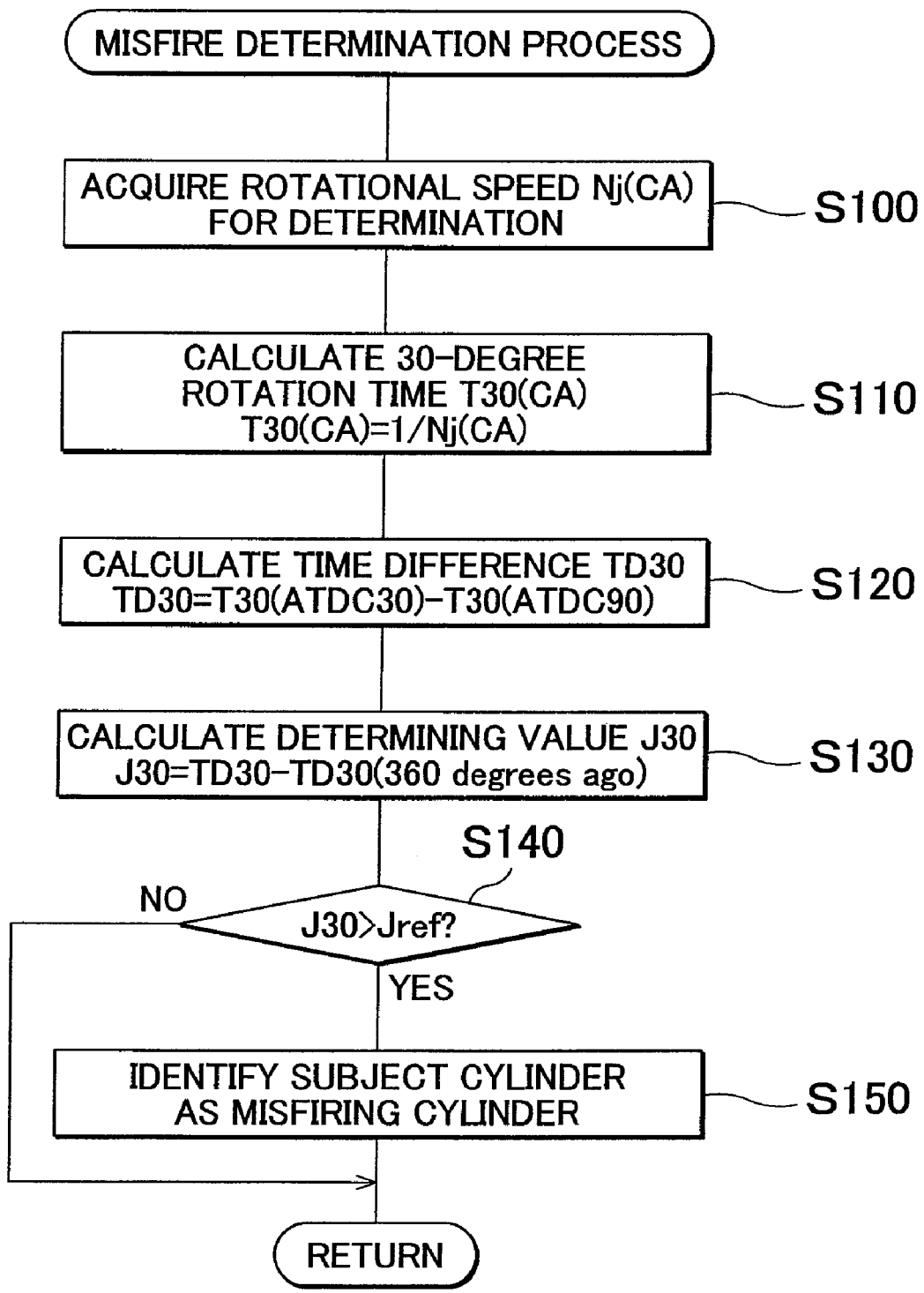
FIG. 3 is a flow chart showing an example of a misfire determination process performed by an engine ECU 24 according to the embodiment of the invention.

Next, an operation performed to determine whether there is a misfire in one of cylinders of the engine 22 mounted on the hybrid car 20 of the embodiment constructed as described above will be described. FIG. 3 is a flow chart showing an example of a misfire determination process performed by the engine ECU 24. This routine is repeatedly performed every predetermined time period.

When the misfire determination process is performed, the CPU 24a of the engine ECU 24 acquires a rotational speed Nj(CA) for determination (step S100), and performs a process of calculating a 30-degree rotation time T30(CA) that is required for the crankshaft 26 to rotate 30 degrees based on the reciprocal of the acquired rotational speed Nj(CA) for determination (step S110). The rotational speed Nj(CA) for determination is a rotational speed obtained by subtracting a component Nde caused by the influence of resonance (resonance influence component) due to torsion of the damper 28 from the rotational speed Ne of the engine 22. The rotational speed Nj(CA) for determination is calculated in a process of calculating the rotational speed for determination. For convenience of explanation, the process of calculating the rotational speed Nj(CA) for determination will be described later.

Next, the difference (T30(ATDC30)−T30(ATDC90)) between the 30-degree rotation time T30(ATDC30) at the point 30 degrees after the top dead center of a compression stroke of the cylinder that is the subject of the misfire determination (ATDC30) and T30(ATDC90) at the point 90 degrees after the same top dead center (ATDC90) is calculated as a time difference TD30 (step S120), and the difference (difference between two time differences TD30s, the latter of which is calculated 360 degrees after the point at which the former is calculated)(TD30−TD30(360 degrees ago)) between the calculated time difference TD30 and the value calculated as the time difference TD30 360 degrees before the point at which the current time difference TD30 is calculated, is calculated as a determining value J30 (step S130). The calculated determining value J30 is compared with a threshold value Jref (step S140). When the determining value J30 is greater than the threshold value Jref, it is determined that there is a misfire in the subject cylinder (step S150), and the misfire determination process is exited. When the determining value J30 is equal to or less than the threshold value Jref, it is determined that there is no misfire in the subject cylinder, and the misfire determination process is exited. Considering the angles relative to the compression top dead center, and the acceleration of the piston 132 due to combustion (explosion) in the engine 22, it should be understood that the time difference TD30 has a negative value when the combustion is normal in the cylinder, and has a positive value when there is a misfire in the cylinder. Thus, when the combustion (explosion) in the subject cylinder is normal, the determining value J30 becomes a value close to zero, and on the other hand, when there is a misfire in the subject cylinder, the determining value J30 becomes a positive value greater than the absolute value of the time difference TD30 of the cylinder in which the combustion is normal. Accordingly, when a value close to the absolute value of the time difference TD30 of the cylinder in which the combustion is normal is set as the threshold value Jref, it is possible to accurately determine the occurrence of a misfire in the subject cylinder.

Figure 5:
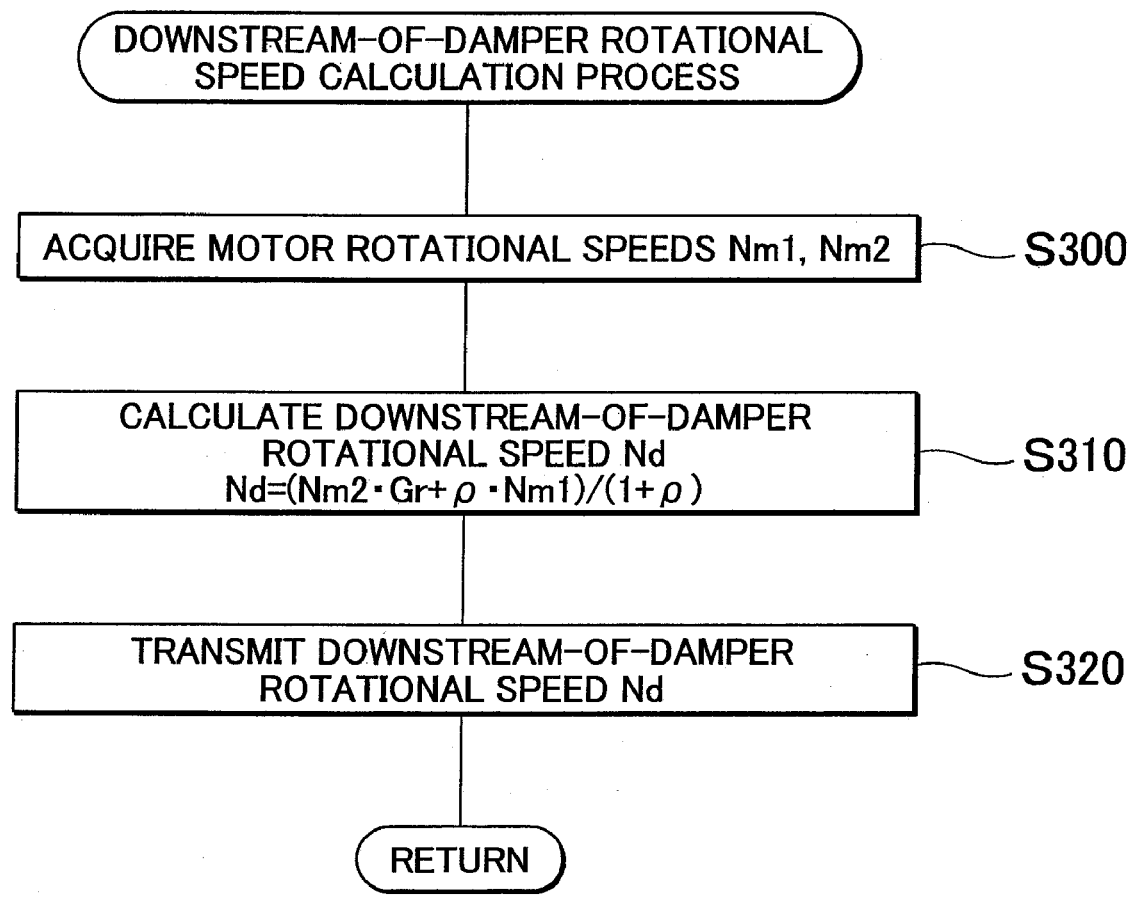
FIG. 5 is a flow chart showing an example of a down-stream-of-damper rotational speed calculation process performed by an electronic control unit 70 for a hybrid system according to the embodiment of the invention.
Figure 6:
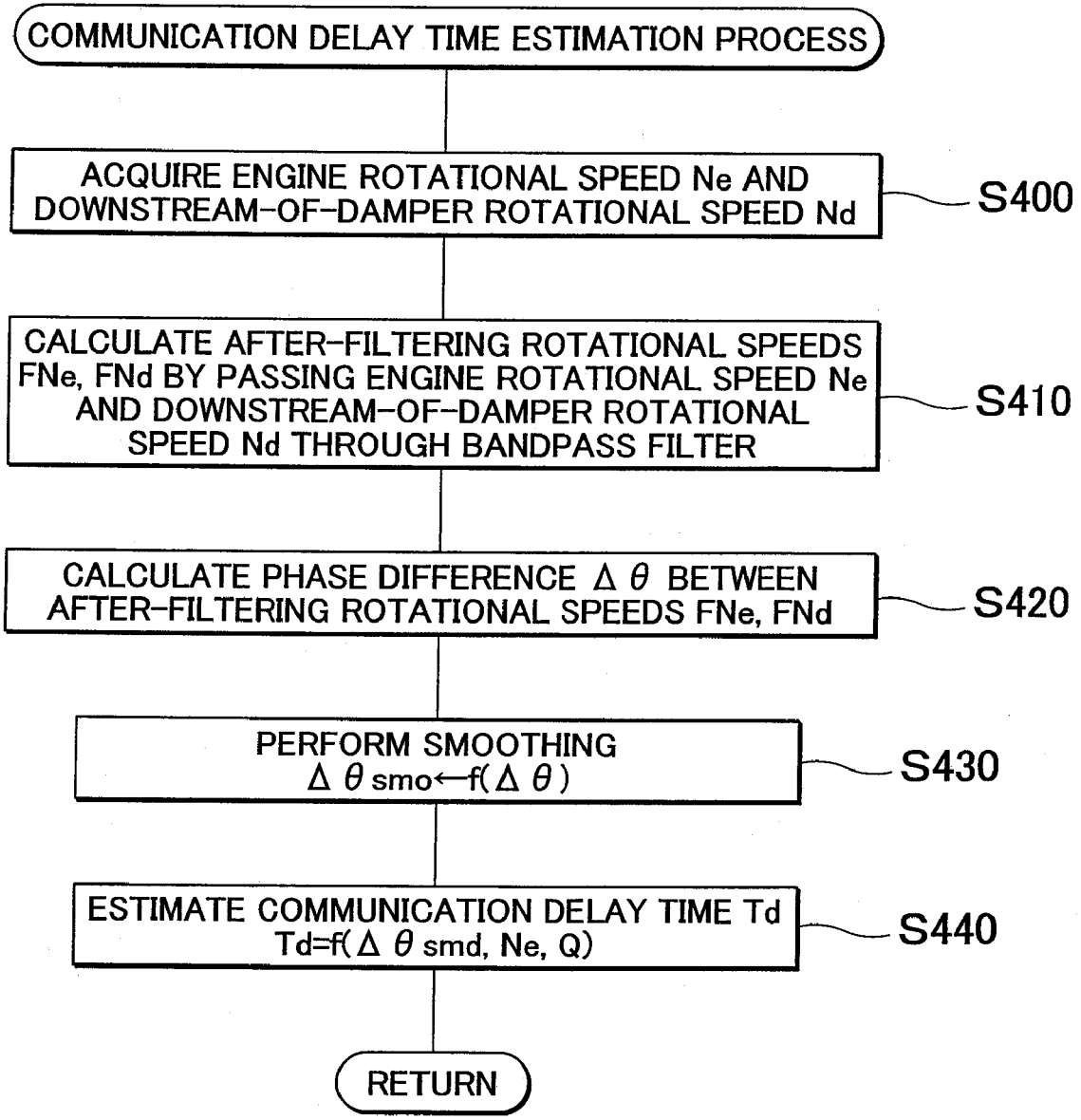
FIG. 6 is a flow chart showing an example of a communication delay time estimation process performed by the engine ECU 24 according to the embodiment of the invention.

Next, the process of calculating the rotational speed Nj(CA) for determination will be described. In the process of calculating the rotational speed Nj(CA) for determination, as shown in the rotational-speed-for-determination calculation process in FIG. 4, the CPU 24a of the engine ECU 24 acquires a communication delay time Td (step S200), and acquires, every 30 degrees of rotation of the crankshaft, the crank angle CA, the rotational speed Ne(CA) of the engine 22, and the rotational speed on the power distribution/integration mechanism 30 side of the damper 28, that is, a rotational speed Nd(CA) downstream of the damper, which is the rotational speed of the carrier shaft 34a, with the acquired communication delay time Td taken into account (step S210). The communication delay time Td is the delay time due to communication performed until the downstream-of-damper rotational speed Nd is acquired in step S210, and is estimated in a process of estimating the delay time due to communication, based on the rotational speed Ne of the engine 22 and the downstream-of-damper rotational speed Nd. Of the rotational speeds Ne of the engine 22 each calculated by the engine ECU 24 every time the crankshaft 26 rotates 30 degrees based on the shaped waves sent from the crank position sensor 140, the rotational speed at the crank angle CA is acquired as the rotational speed Ne(CA) of the engine 22. Of the rotational speeds Nd calculated by the hybrid ECU 70 in the downstream-of-damper rotational speed calculation process, the rotational speed Nd at the crank angle CA that is received the communication delay time Td in advance of when the rotational speed Ne(CA) of the engine 22 is received is acquired as the downstream-of-damper rotational speed Nd(CA) via communication. It is preferable that, as the rotational speed Ne of the engine 22, one that is received when the rotational speed Ne of the engine 22 that is used in the calculation of the communication delay time Td is received be acquired. FIG. 5 is a flow chart showing an example of the downstream-of-damper rotational speed calculation process. FIG. 6 is a flow chart showing an example of the communication-delay-time estimation process. The downstream-of-damper rotational speed calculation process shown in FIG. 5 and the communication-delay-time estimation process shown in FIG. 6 will be described below in this order.

In the process of calculating the downstream-of-damper rotational speed Nd, as shown in the downstream-of-damper rotational speed calculation process shown in FIG. 5, the CPU 72 of the hybrid ECU 70 acquires the rotational speeds Nm1, Nm2 of the motors MG1, MG2 (step S300), and calculates the downstream-of-damper rotational speed Nd according to the following equation (1) using the acquired rotational speeds Nm1, Nm2 of the motors MG1, MG2, the gear ratio p of the power distribution/integration mechanism 30 (the number of teeth of the sun gear/the number of teeth of the ring gear), and the gear ratio Gr of the speed reduction gear 35 (step S310). Then, the calculated downstream-of-damper rotational speed Nd is transmitted to the engine ECU 24 (step S320), and this process is exited. The rotational speeds Nm1, Nm2 that are calculated based on the signals from the rotational position detection sensors 43, 44 are acquired via communication. Thus, because the downstream-of-damper rotational speed Nd(CA) that is calculated by the hybrid ECU 70 according to the following equation (1) using the rotational speeds Nm1, Nm2 of the motors MG1, MG2 supplied from the motor ECU 40 via communication is acquired by the engine ECU 24 via communication, communication delay occurs, and the acquired downstream-of-damper rotational speed Nd is different from the actual, or current, downstream-of-damper rotational speed Nd.

$$Nd=[Nm2 \cdot Gr + \rho \cdot Nm1]/(1+\rho) \quad (1)$$

Figure 7:
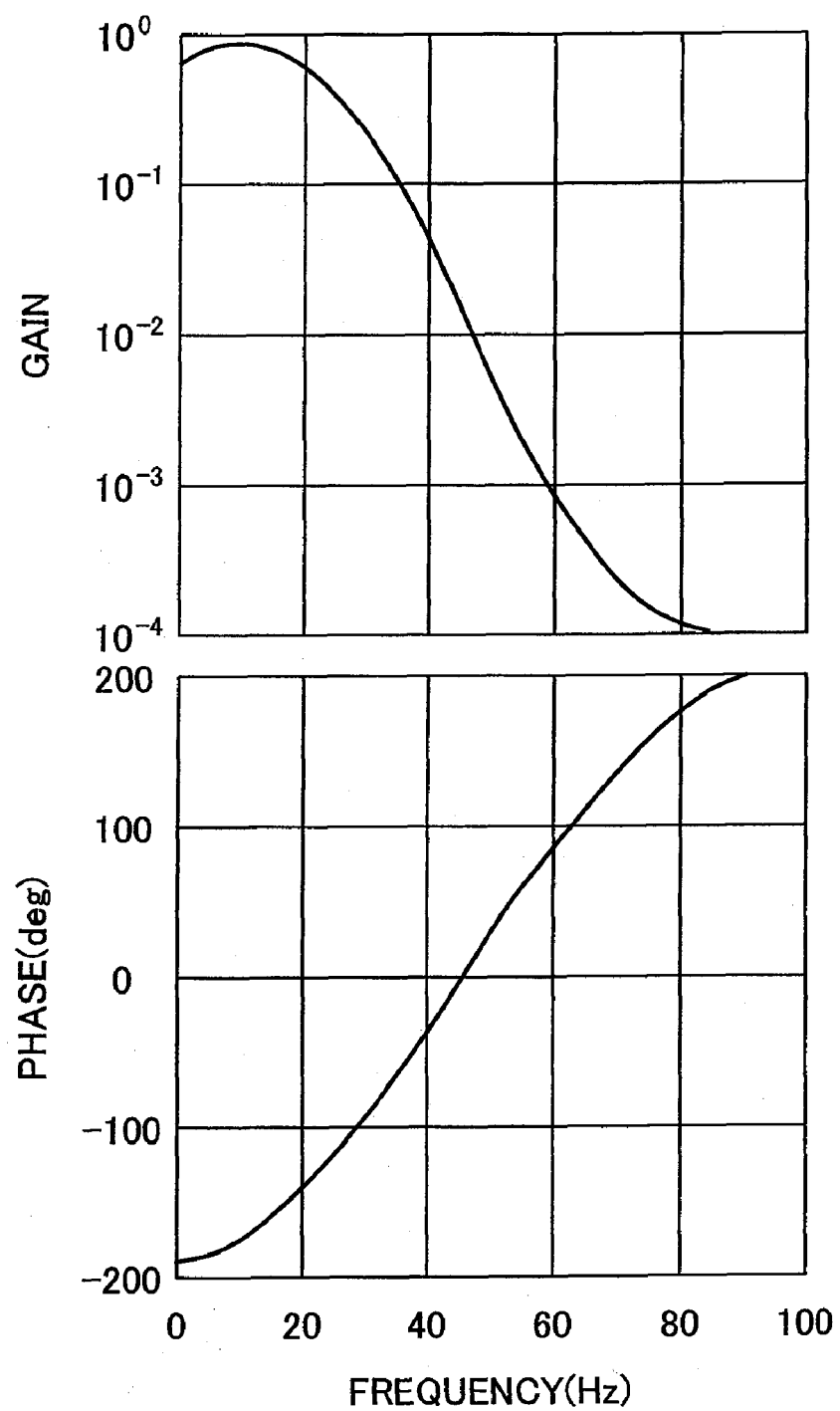
FIG. 7 is an explanatory diagram showing an example of characteristics of a band-pass filter according to the embodiment of the invention.
Figure 8:
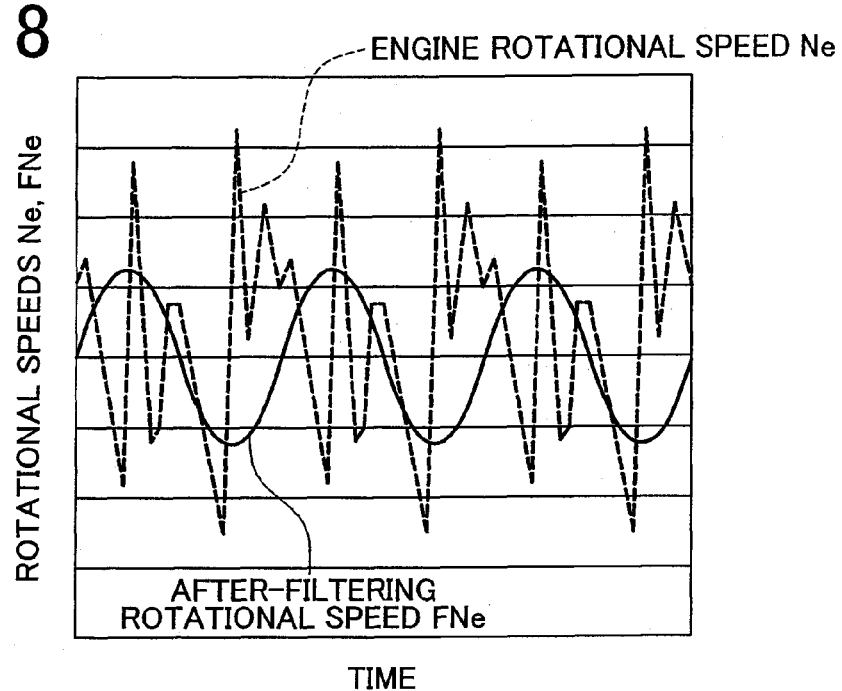
FIG. 8 is an explanatory diagram showing an example of a relation between rotational speed Ne of the engine 22 and after-filtering rotational speed FNe according to the embodiment of the invention.

In the communication-delay-time estimation process, as shown by the communication-delay-time estimation process shown in FIG. 6, the CPU 24a of the engine ECU 24 acquires the rotational speed Ne of the engine 22 and the downstream-of-damper rotational speed Nd (step S400). The acquisitions of the rotational speed Ne of the engine 22 and the downstream-of-damper rotational speed Nd have been described above. Subsequently, a rotational speed FNe after filtering is calculated by passing the acquired rotational speed Ne of the engine 22 through a band-pass filter, and a rotational speed FNd after filtering is calculated by passing the acquired downstream-of-damper rotational speed Nd through the same band-pass filter (step S410). The band-pass filter extracts, from the rotational speed Ne of the engine 22 and the downstream-of-damper rotational speed Nd, the resonance frequency components caused by torsion of the damper 28. FIG. 7 shows an example of the band-pass filter. Assuming that the resonance due to torsion of the damper 28 occurs in the cycle in which misfires occur, that is, the cycle in which the crankshaft 26 rotates twice (half of the rotational cycle), when the rotational speed Ne of the engine 22 is 1000 rpm, a filter that does not damp 8 Hz, which is the resonance frequency, and significantly damps (to one tenth or below, for example) the other bands may be used as the band-pass filter. In this way, it is possible to make the signals indicating the after-filtering rotational speeds FNe, FNd have smooth sinusoidal waveforms with low noise. FIG. 8 shows an example of the rotational speed Ne of the engine 22 and the after-filtering rotational speed FNe.

Figure 9:
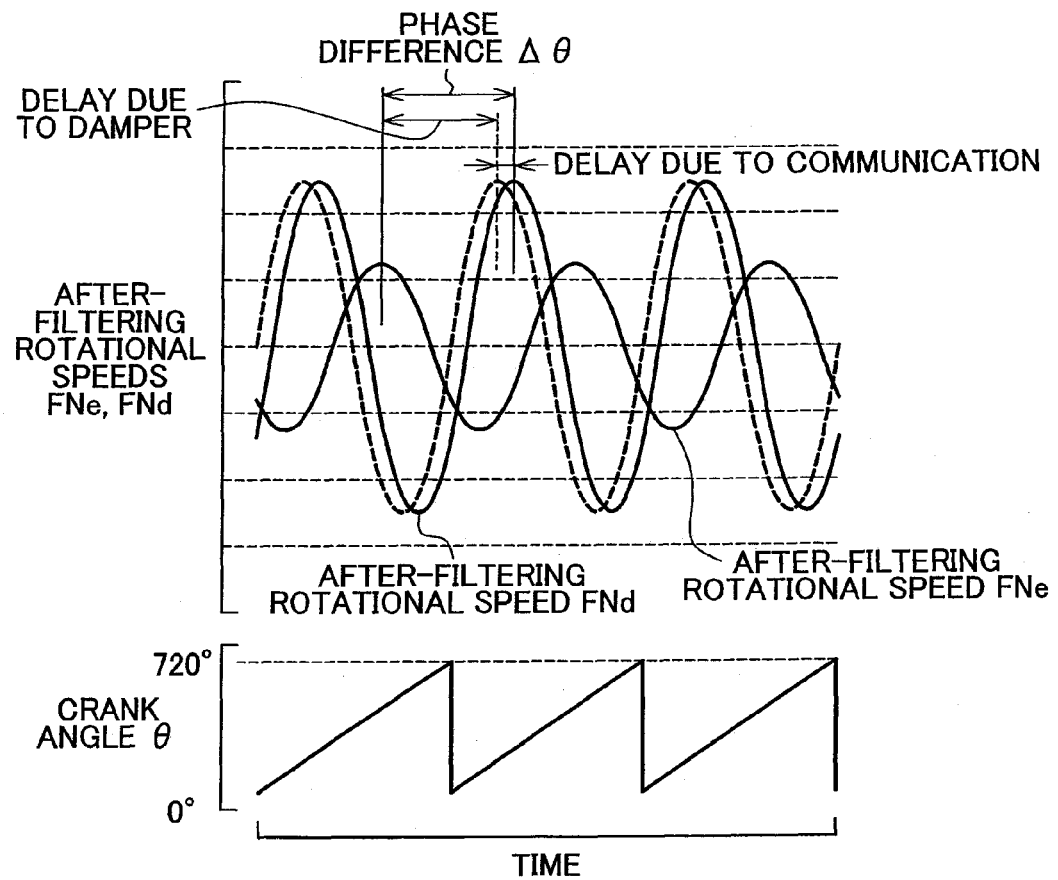
FIG. 9 is an explanatory diagram showing a relation between phases of the after-filtering rotational speed FNe and after-filtering rotational speed FNd according to the embodiment of the invention.
Figure 10:
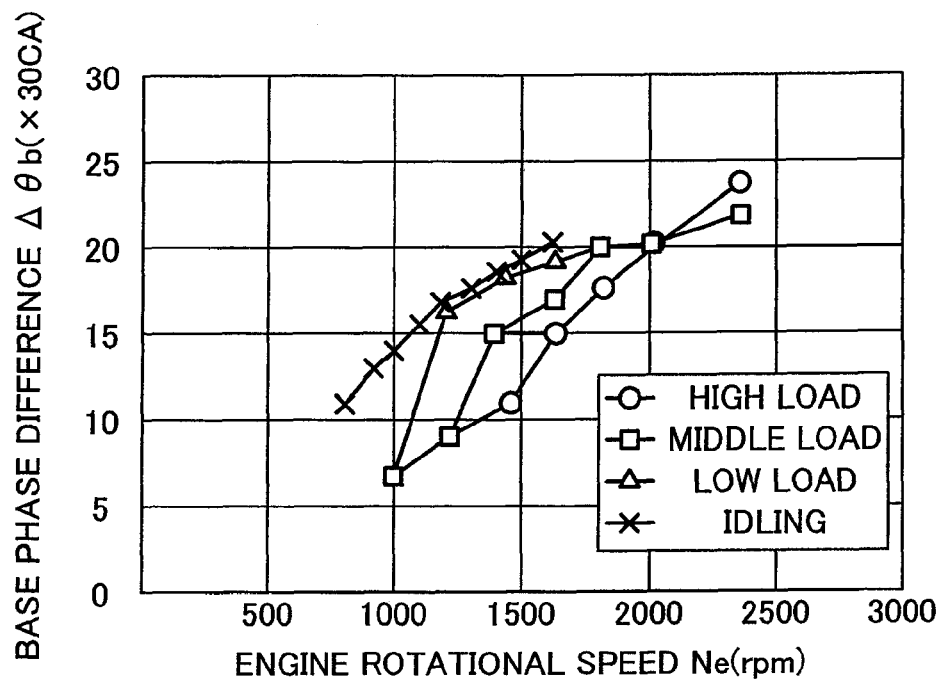
FIG. 10 is an explanatory diagram showing an example of a base phase difference setting map according to the embodiment of the invention.

After the after-filtering rotational speeds FNe, FNd are calculated in this way, the peak point of the after-filtering rotational speed FNe and the peak point of the after-filtering rotational speed FNd are compared to calculate a phase difference $\Delta\theta$ (step S420), and the calculated phase difference $\Delta\theta$ is smoothed to calculate a phase difference $\Delta\theta$smo after smoothing (step S430). The communication delay time Td is estimated based on the after-smoothing phase difference $\Delta\theta$smo, the rotational speed Ne of the engine 22, and the load (the intake air amount Q sent from the air flow meter 148) (step S440), and the process is exited. An example of the relations between the phases of the after-filtering rotational speeds FNe, FNd is shown in FIG. 9. Because the crankshaft 26 is connected, through the damper 28, to the carrier shaft 34a downstream of the damper 28, a phase delay of the downstream-of-damper rotational speed Nd relative to the rotational speed Ne of the engine 22 occurs due to physical delay characteristics. Meanwhile, the engine ECU 24 directly calculates the rotational speed Ne of the engine 22 based on the signal from the crank position sensor 140, and acquires the downstream-of-damper rotational speed Nd that is calculated by the hybrid ECU 70 based on the rotational speeds Nm1, Nm2 of the motors MG1, MG2 supplied from the motor ECU 40 via communication. Thus, the downstream-of-damper rotational speed Nd has a phase delay relative to the rotational speed Ne of the engine 22 caused by the delay due to communication performed until the downstream-of-damper rotational speed Nd is received. The physical delay characteristics of the damper 28 depend only on the rotational speed Ne of the engine 22 (also depend on the load in some cases), and it is therefore possible to determine the characteristics based on the rotational speed Ne of the engine 22 and the load. Thus, by detecting the phase difference between the rotational speed Ne of the engine 22 and the downstream-of-damper rotational speed Nd, it is possible to estimate the communication delay time Td based on the phase difference, the rotational speed Ne of the engine 22, and the load. In this embodiment, because the rotational speed Ne of the engine 22 and the downstream-of-damper rotational speed Nd contain much noise, it is not easy to directly detect the phase difference between the rotational speeds Ne, Nd. Thus, the communication delay time Td is estimated by detecting the phase difference $\Delta\theta$ between the rotational speeds FNe, FNd after converting the rotational speed Ne of the engine 22 and the downstream-of-damper rotational speed Nd into the after-filtering rotational speeds FNe, FNd having a smooth sinusoidal waveforms with low noise with the use of the band-pass filter that extracts the resonance frequency component caused by torsion of the damper 28. With regard to the estimation of the communication delay time Td, in this embodiment, the relations between the rotational speed Ne of the engine 22, the load (intake air amount), and the base phase difference $\Delta\theta$b are empirically determined, the determined relations are stored in the form of maps in the ROM 24b in advance, and, when the rotational speed Ne of the engine 22 and the load are given, the corresponding base phase difference $\Delta\theta$b is derived, and the estimation of the communication delay time Td is performed based on the difference between the derived base phase difference Δθb and the calculated after-smoothing phase difference Δθsmo. FIG. 10 shows an example of the map. The base phase difference Δθb is the empirically-determined phase difference between the after-filtering rotational speeds FNe, FNd that are obtained when the average communication delay time is taken into consideration that is the ordinary delay time due to communication performed until the downstream-of-damper rotational speed Nd is received by the engine ECU 24 while the engine 22 is in a steady operation state. Thus, the difference between the base phase difference Δθb and the after-smoothing phase difference Δθsmo can be considered as the deviation from the average communication delay time, and it is therefore possible to estimate the communication delay time Td based on the sum of the time corresponding to the deviation and the average communication delay time. The reason why the after-smoothing phase difference Δθsmo is used to estimate the communication delay time Td is to obtain a favorable follow-up characteristics with respect to the change in the rotational speed Ne of the engine 22 and the change in the load because the base phase difference Δθb is determined on the assumption that the engine is in a steady operation state.

As described above, in the communication-delay-time estimation process shown in FIG. 6, the communication delay time Td is estimated using the phase difference between the after-filtering rotational speeds FNe, FNd that are obtained by extracting the resonance frequency components caused by torsion of the damper 28 from the rotational speed Ne of the engine 22 and the downstream-of-damper rotational speed Nd. Because resonance occurs in the cycle in which the engine 22 misfires, the communication-delay-time estimation process may be performed only when the determining value J30 is close to the threshold value Jref, which means that there is a possibility that a misfire in the engine 22 is occurring. In this case, the above-described average communication delay time may be set as the communication delay time Td.

When the process returns to step S210 of the rotational-speed-for-determination calculation process shown in FIG. 4, and the crank angle CA, the rotational speed Ne(CA) of the engine 22, and the downstream-of-damper rotational speed Nd(CA) that is received the estimated communication delay time Td in advance of when the corresponding rotational speed Ne(CA) is received are acquired, the torsion angle θd(CA) of the damper 28 is calculated according to the following equation (2) using the rotational speed Ne(CA) of the engine 22 and the downstream-of-damper rotational speed Nd(CA) (step S220). A noise-containing resonance influence component Nden(CA) containing low-frequency noise is calculated as the influence of resonance of the damper 28 on the rotational speed of the engine 22, according to the following equation (3) using a constant ratio (K/J) that is the ratio between the spring constant K of the damper 28 and a moment of inertia J on the engine 22 side of the damper 28 and the calculated torsion angle θd(CA) (step S230).

$$\theta d(CA) = \int \{Ne(CA) - Nd(CA)\} dt \quad (2)$$

$$Nden(CA) = (K/J) \cdot \int \theta d(CA) dt \quad (3)$$

In order to eliminate low-frequency noise in the noise-containing resonance influence component Nden(CA), the noise-containing resonance influence component Nden(CA) is passed through a high-pass filter to calculate a resonance influence component Nde(CA) (step S240), and the rotational speed Nj(CA) for determination is calculated by subtracting the calculated resonance influence component Nde(CA) from the rotational speed Ne(CA) of the engine 22 (step S250).

With regard to the high-pass filter, it suffices that the cut-off frequency is set so that the resonance frequency of the damper 28 is not damped, while the band of frequencies lower than the resonance frequency is damped. When such a high-pass filter is used, it is possible to eliminate the low-frequency components accumulated due to the integrations according to the above-described equations (2) and (3).

The rotational speed Nj(CA) for determination that is calculated in the rotational-speed-for-determination calculation process is obtained by subtracting the resonance influence component Nde(CA), which is the component caused by the influence of resonance due to torsion of the damper 28 from the rotational speed detected by the crank position sensor 140 and calculated, that is, the rotational speed Ne of the engine 22 that is the rotational speed subjected to the influence of the resonance due to torsion of the damper 28. Thus, the rotational speed Nj(CA) for determination reflects only the rotational fluctuation caused by the explosion (combustion) and the misfire in each cylinder of the engine 22. Thus, when the misfire determination in the engine 22 is performed using the rotational speed Nj(CA) for determination, it is possible to accurately determine the occurrence of a misfire in the engine 22 even when the resonance caused by torsion of the damper 28 is occurring.

According to the misfire determination device for an internal combustion engine that is mounted on the hybrid car 20 of the above-described embodiment, the after-filtering rotational speeds FNe, FNd are calculated by passing the rotational speed Ne of the engine 22 and the downstream-of-damper rotational speed Nd on the downstream side of the damper 28 through a band-pass filter that extracts, from the rotational speed Ne of the engine 22 and the downstream-of-damper rotational speed Nd, the resonance frequency components caused by torsion of the damper 28, and the delay time Td due to communication performed until the downstream-of-damper rotational speed Nd is received by the engine ECU 24 is estimated based on the phase difference Δθ between the calculated after-filtering rotational speeds FNe, FNd and on the rotational speed Ne of the engine 22. Then, the rotational speed Ne(CA) of the engine 22 is calculated, and the downstream-of-damper rotational speed Nd(CA) that is received the estimated communication delay time Td in advance of when the corresponding rotational speed Ne(CA) of the engine 22 is received, is acquired. Then, the resonance influence component Nde(CA) is calculated with the use of the rotational speed Ne(CA) of the engine 22 and the downstream-of-damper rotational speed Nd(CA), the rotational speed Nj(CA) for determination is calculated by subtracting the resonance influence component Nde(CA) from the rotational speed Ne(CA) of the engine 22, and the occurrence of a misfire in the engine 22 is determined based on the rotational speed Nj(CA) for determination. The resonance influence component Nde(CA) can be calculated based on the rotational speed Ne(CA) of the engine 22 and the downstream-of-damper rotational speed Nd(CA), in which the influence of delay due to communication performed until the downstream-of-damper rotational speed Nd is received by the engine ECU 24 is eliminated. Thus, it is possible to accurately determine the occurrence of a misfire in the engine 22 even when there is a resonance due to torsion of the damper 28 by determining the occurrence of a misfire in the engine 22 based on the rotational speed Nj(CA) for determination obtained by subtracting the resonance influence component Nde(CA) from the rotational speed Ne(CA) of the engine 22. In addition, because the after-smoothing phase difference Δθsmo obtained by smoothing the phase difference Δθ between the after-filtering rotational speeds FNe, FNd is used, it is possible to accurately estimate the communication delay time Td not only when the engine 22 is in a steady state but also when the engine 22 is in a transitional state.

In the misfire determination process performed in the misfire determination device for the internal combustion engine mounted on the hybrid car 20 of the above-described embodiment, although it is not assumed that vibration control for controlling the vibration based on the variation in torque of the ring gear shaft 32a connected to the axel shaft side is performed using the motors MG1, MG2, it is possible to determine the occurrence of a misfire in the engine 22 with the use of the above-described misfire determination process even when the vibration control is performed with the use of the motors MG1, MG2.

Although the misfire determination device for an internal combustion engine mounted on the hybrid car 20 of the embodiment is configured such that the engine ECU 24, the motor ECU 40, and the hybrid ECU 70 can communicate with each other with the use of CAN, the communication is not limited to that using CAN. Other communication systems, such as the communication using Direct Memory Access (DMA), may be used.

In the misfire determination device for an internal combustion engine mounted on the hybrid car 20 of the embodiment, the engine ECU 24 directly calculates the rotational speed Ne of the engine 22 based on the signal from the crank position sensor 140, acquires, via communication, the downstream-of-damper rotational speed Nd that is calculated by the hybrid ECU 70 based on the rotational speeds Nm1, Nm2 of the motors MG1, MG2 supplied from the motor ECU 40 via communication, and calculates the rotational speed Nj(CA) for determination with the use of the engine ECU 24 based on such a rotational speed Ne and a downstream-of-damper rotational speed Nd. However, the rotational speed Ne of the engine 22 may be calculated by another ECU and acquired via communication, and the downstream-of-damper rotational speed Nd that is directly calculated may be used. Alternatively, the rotational speed Ne of the engine 22 may be calculated by another ECU and acquired via communication, and the downstream-of-damper rotational speed Nd that is calculated by another ECU than the ECU that calculates the rotational speed Ne may be used.

In the misfire determination device for an internal combustion engine mounted on the hybrid car 20 of the embodiment, the base phase difference $\Delta\theta b$ used in estimating the communication delay time Td is determined on the assumption that the base phase difference $\Delta\theta b$ is the phase difference between the after-filtering rotational speeds FNe, FNd in which the average delay time due to communication performed until the downstream-of-damper rotational speed Nd is received by the engine ECU 24 while the engine 22 is in a steady operation state is taken into consideration. However, the phase difference determined may be a phase difference between the after-filtering rotational speeds FNe, FNd obtained when the delay due to communication performed until the downstream-of-damper rotational speed Nd is received by the engine ECU 24 while the engine 22 is in a steady operation is not taken into consideration. In this case, the phase difference between the after-filtering rotational speeds FNe, FNd directly corresponds to the communication delay time Td.

Although, in the misfire determination device for an internal combustion engine mounted on the hybrid car 20 of the embodiment, the communication delay time Td is estimated based on the phase difference between the after-filtering rotational speeds FNe, FNd, rotational speed Ne of the engine 22, and the load (intake air amount), the communication delay time Td may be estimated based on the phase difference between the after-filtering rotational speeds FNe, FNd and the rotational speed Ne of the engine 22 without taking account of the load of the engine 22.

Although, in the misfire determination device for an internal combustion engine mounted on the hybrid car 20 of the embodiment, the communication delay time Td is estimated using the after-smoothing phase difference $\Delta\theta smo$ that is obtained by smoothing the phase difference $\Delta\theta$ between the after-filtering rotational speeds FNe, FNd, the communication delay time Td may be estimated using the phase difference $\Delta\theta$ that is not smoothed.

Figure 11:
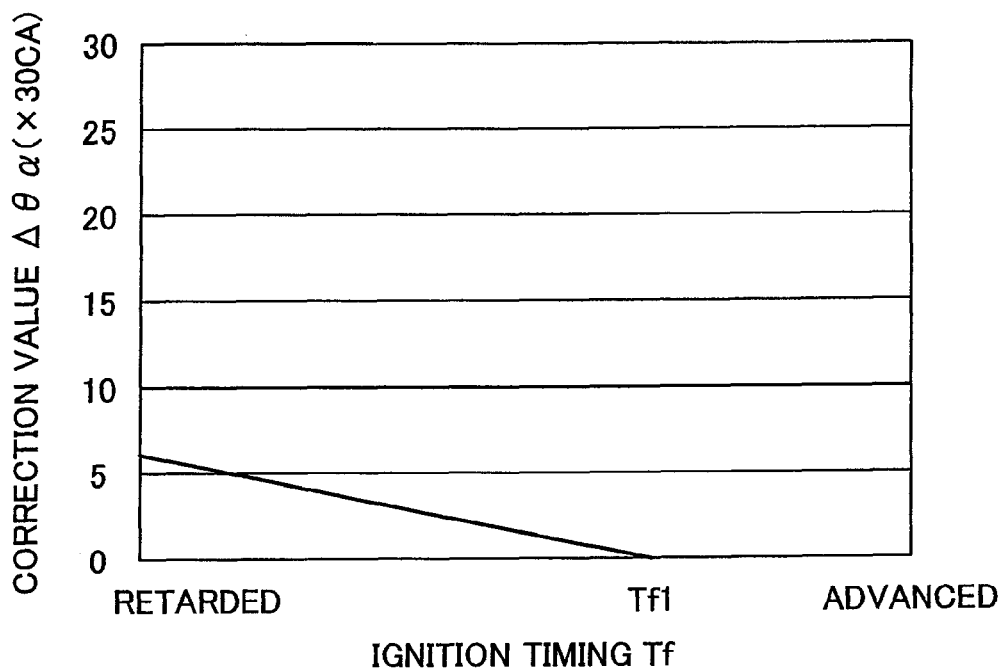
FIG. 11 is an explanatory diagram showing an example of a correction value setting map according to the embodiment of the invention.

Although, in the hybrid car 20 of the embodiment, the communication delay time Td is estimated based on the after-smoothing phase difference $\Delta\theta smo$, the rotational speed Ne of the engine 22, and the load (the intake air amount Q sent from the air flow meter 148), the communication delay time Td may be estimated with the combustion conditions (the timing Tf of ignition by the ignition plug 130, for example) additionally taken into consideration. In this case, for example, the base phase difference $\Delta\theta b$ may be derived based on the rotational speed Ne of the engine 22 and the load (intake air amount Q) as in the case of the embodiment, a correction value $\Delta\theta\alpha$ may be set based on the ignition timing Tf, and the communication delay time Td may be estimated based on the sum of the average communication delay time and the time corresponding to the difference between the sum of the after-smoothing phase difference $\Delta\theta smo$ and the derived base phase difference $\Delta\theta b$ and the correction value $\Delta\theta\alpha$ ($\Delta\theta b+\Delta\theta\alpha$) (deviation from the above-described average communication delay time). The correction value $\Delta\theta\alpha$ is set by empirically determining the relation between the ignition timing Tf and the correction value $\Delta\theta\alpha$ in advance, storing the relation as a correction value setting map, and, when ignition timing Tf is given, deriving the corresponding correction value $\Delta\theta\alpha$ from the stored map. FIG. 11 shows an example of the correction value setting map. In FIG. 11, "Tf1" is the ignition timing for maximizing the output torque from the engine 22. In the example shown in FIG. 11, the correction value $\Delta\theta\alpha$ is set such that the correction value $\Delta\theta\alpha$ linearly increases as the ignition timing Tf is retarded relative to the timing Tf1. It is conceivable that the communication delay time Td depends not only on the rotational speed Ne of the engine 22 and the load, but also on the combustion conditions in the engine 22. Nevertheless, the communication delay time Td can be further accurately estimated by estimating the communication delay time Td with the ignition timing Tf taken into consideration in this way. As a result, even when ignition is performed by the ignition plug 130 at a maximally retarded timing or a timing slightly earlier than the maximally retarded timing in order to warm up the three-way catalyst of the purification device 134, the communication delay time Td can be further accurately estimated. Although, in this modification, as shown in FIG. 11, the correction value $\Delta\theta\alpha$ is set such that the correction value $\Delta\theta\alpha$ linearly increases as the ignition timing Tf is retarded, the correction value $\Delta\theta\alpha$ may be set such that the correction value $\Delta\theta\alpha$ increases in a curve or stepwise at 1 or greater intervals as the ignition timing Tf is retarded. In this modification, the communication delay time Td is estimated based on the sum of the average communication delay time and the time corresponding to the difference between the after-smoothing phase difference $\Delta\theta smo$ and the sum of the base phase difference $\Delta\theta b$ and the correction value $\Delta\theta\alpha$ ($\Delta\theta b+\Delta\theta\alpha$) (deviation from the above-described average communication delay time). However, a configuration may be adopted in which the communication delay time Td is estimated based on the after-smoothing phase difference $\Delta\theta smo$, the rotational speed Ne of the engine 22, and the load (the intake air amount Q) as in the case of the process of step S440 of the embodiment, the correction value $\Delta Td$ depending on the ignition timing Tf may be set, and the communication delay time Td may be again estimated by adding the correction value ΔTd to the estimated communication delay time Td. In this case, the correction value ΔTd may be set such that the correction value ΔTd increases as the ignition timing is retarded.

In the misfire determination device for an internal combustion engine mounted on the hybrid car 20 of the embodiment, the torsion angle θd(CA) of the damper 28 is calculated based on the rotational speed Ne(CA) of the engine 22 and the downstream-of-damper rotational speed Nd(CA) on the downstream side of the damper 28, the noise-containing resonance influence component Nden(CA) is calculated based on the spring constant K, the constant ratio (K/J), and the torsion angle θd(CA), the noise-containing resonance influence component Nde(CA) is passed through a high-pass filter to calculate the resonance influence component Nde(CA), the rotational speed Nj(CA) for determination is calculated by subtracting the resonance influence component Nde(CA) from the rotational speed Ne(CA) of the engine 22, and the occurrence of a misfire in the engine 22 is determined based on the rotational speed Nj(CA) for determination. However, any calculation method may be used as long as the resonance influence component Nde(CA) is calculated using the rotational speed Ne(CA) of the engine 22 and the downstream-of-damper rotational speed Nd(CA) on the downstream side of the damper 28. The resonance influence component Nde(CA) does not have to be calculated by passing the noise-containing resonance influence component Nden(CA) through a high-pass filter.

Although, in the misfire determination device for an internal combustion engine mounted on the hybrid car 20 of the embodiment, the downstream-of-damper rotational speed Nd is calculated based on the rotational speeds Nm1, Nm2 of the motors MG1, MG2, a rotational speed sensor may be provided for the carrier shaft 34a to directly detect the rotational speed of the carrier shaft 34a, and the detected rotational speed may be used as the downstream-of-damper rotational speed Nd.

Figure 12:
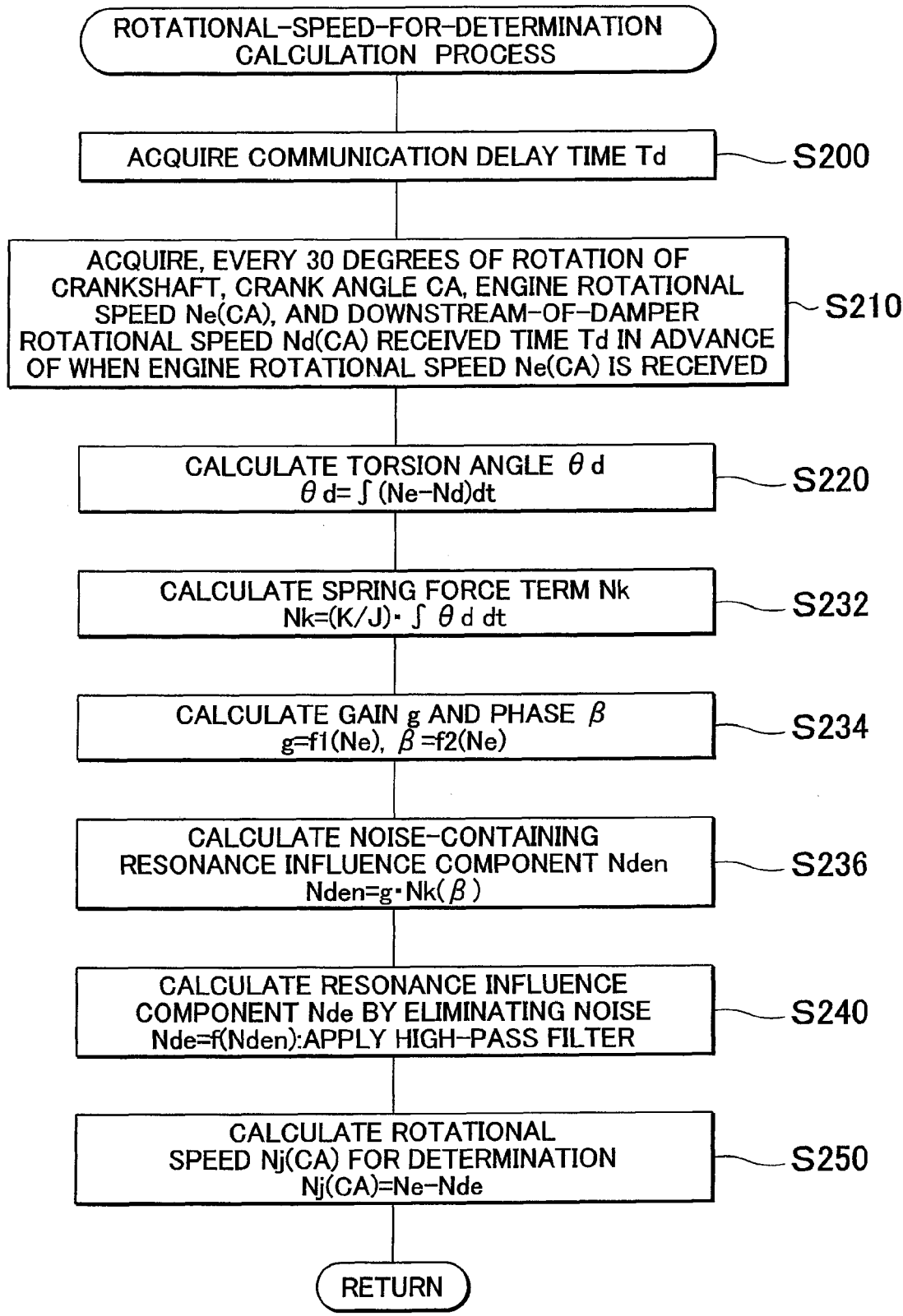
FIG. 12 is a flow chart showing an example of a rotational-speed-for-determination calculation process according to the embodiment of the invention.

In the misfire determination device for an internal combustion engine mounted on the hybrid car 20 of the embodiment, in the process of calculating the rotational speed Nj(CA) for determination, the noise-containing resonance influence component Nden(CA) is calculated according to the above equation (3) using the torsion angle θd(CA) of the damper 28 that is calculated with the use of the rotational speed Ne(CA) of the engine 22 and the downstream-of-damper rotational speed Nd(CA), and using the constant ratio (K/J) that is the ratio between the spring constant K of the damper 28 and the moment of inertia J on the engine 22 side of the damper 28. However, the component obtained by reflecting, in the spring force term of the damper 28 calculated according to the equation (3), a gain g and a phase β, which are influences of the damping force term of the damper 28 on the spring force term thereof may be calculated as the noise-containing resonance influence component Nden(CA). A flow chart of the rotational-speed-for-determination calculation process in this case is shown in FIG. 12. In this rotational-speed-for-determination calculation process, after the torsion angle θd(CA) of the damper 28 is calculated, the spring force term Nk is calculated that is calculated on the assumption that the left hand side of the equation (3) is the spring force term Nk of the damper 28 (step S232), the gain g and the phase β that are influences of the damping force term of the damper 28 on the spring force term Nk according to the following equations (4) and (5) based on the rotational speed Ne(CA) of the engine 22 (step S234), and the noise-containing resonance influence component Nden(CA) is calculated with the calculated gain g and phase β reflected in the spring force term Nk (step S236). In order to eliminate low-frequency noise in the noise-containing resonance influence component Nden(CA), the noise-containing resonance influence component Nden(CA) is passed through a high-pass filter to calculate a resonance influence component Nde(CA) (step S240), and the rotational speed Nj(CA) for determination is calculated by subtracting the calculated resonance influence component Nde(CA) from the rotational speed Ne(CA) of the engine 22 (step S250). Next, the gain g and the phase β will be described that are influences of the damping force term of the damper 28 on the spring force term Nk.

$$g = \sqrt{1 + (2\pi f)^2 \cdot \left(\frac{Cdamp}{Kdamp}\right)^2} \tag{4}$$

$$\beta = \tan^{-1}\frac{(2\pi f) \cdot Cdamp}{Kdamp} \tag{5}$$

Assume that the rotational angular velocity of the damper 28 that is a component that exerts an influence on the crankshaft 26 is ωe-damp, the angular velocity of the crankshaft 26 is ωe, the angular velocity of the shaft on the downstream side of the damper 28 is ωinp, the rotational angle of the crankshaft 26 is θe, the rotational angle of the shaft downstream of the damper 28 is θinp, the spring constant of the damper 28 is Kdamp, the constant of the damping force term of the damper 28 is Cdamp, and the moment of inertia of on the engine 22 side of the damper 28 is Ie. Then, the component ωe-damp that is an influence of the damper 28 on the crankshaft 26 can be expressed by the equation (6), which can be transformed into the equation (7). The first term on the right hand side of the equation (6)) is the spring force term, and the second term on the right hand side thereof is the damping force term.

$$\omega e\text{-}damp = \frac{Kdamp}{Ie}\int(\theta inp - \theta e)dt + \frac{Cdamp}{Ie}\int(\omega inp - \omega e)dt \tag{6}$$

$$\omega e\text{-}damp = \frac{Kdamp}{Ie}\int\int(\omega inp - \omega e)dt^2 + \frac{Cdamp}{Ie}\int(\omega inp - \omega e)dt \tag{7}$$

When it is assumed that the where, frequency of misfires when there is a misfire in one of the cylinders of the engine 22 is f, the amplitude of the torsional angular velocity of the damper 28 is α, and the torsional angular velocity of the damper 28 is expressed by the equation (8), the equation (7) can be transformed into the equation (9). By comparing the first term, which is the spring force term, on the right hand side of the second line and the third line of the equation (9), the above equations (4) and (5) can be obtained.

$$(\omega inp - \omega e) = \alpha \cdot \sin(2\pi f) \tag{8}$$

$$\begin{aligned}\omega e\text{-}damp &= \frac{Kdamp}{Ie}\int\int(\alpha \cdot \sin(2\pi f))dt^2 + \\ &\quad \frac{Cdamp}{Ie}\int(\alpha \cdot \sin(2\pi f))dt \\ &= \frac{Kdamp}{Ie}\cdot\frac{-\alpha \cdot \sin(2\pi f)}{(2\pi f)^2} + \frac{Cdamp}{Ie}\cdot\frac{-\alpha\cos(2\pi f)}{(2\pi f)} \\ &= \frac{-\alpha}{Ie\cdot(2\pi f)^2}\sqrt{Kdamp^2 + (2\pi f)^2 \cdot Cdamp^2} \cdot \\ &\quad \sin(2\pi f + \beta)\end{aligned} \tag{9}$$

where, $$\tan\beta = \frac{(2\pi f) \cdot Cdamp}{Kdamp}$$

When it is assumed that misfires consecutively occur in one of the cylinders of the engine 22, a misfire occurs per two rotations of the crankshaft 26, and the frequency f of misfires can be calculated as f=Ne/120 using the rotational speed Ne of the engine 22. Thus, the gain g and the phase β that are influences of the damping force term of the damper 28 on the spring force term Nk can be calculated by substituting, into the equations (4) and (5), the values of the frequency f of misfires calculated using the rotational speed Ne of the engine 22, the spring constant Kdamp obtained by multiplying the constant ratio (K/J) by the moment of inertia J empirically obtained in advance, and the constant Cdamp empirically obtained in advance. Needless to say, the rotational speed Ne of the engine 22 and the downstream-of-damper rotational speed Nd can be replaced by the angular velocity ωe of the crankshaft 26 and the angular velocity ωinp of the shaft downstream of the damper 28 by multiplying the rotational speed Ne(CA) of the engine 22 and the downstream-of-damper rotational speed Nd by a conversion constant, such as 2π/60.

By calculating the gain g and the phase β that are influences of the damping force term of the damper 28 on the spring force term Nk, and calculating the noise-containing resonance influence component Nden(CA) with the calculated gain g and phase β reflected in the spring force term Nk, it is possible to more properly calculate the noise-containing resonance influence component Nden(CA), and it is possible to more properly calculate the rotational speed Nj(CA) for determination. As a result, it is possible to more accurately determine the occurrence of a misfire in the engine 22.

The misfire determination device for an internal combustion engine mounted on the hybrid car 20 of the embodiment acquires the crank angle CA, the rotational speed Ne(CA) of the engine 22, and the rotational speeds Nm1(CA), Nm2(CA) of the motors MG1, MG2 that are sampled every 30 degrees of rotation of the crankshaft, calculates the downstream-of-damper rotational speed Nd(CA) and the resonance influence component Nde(CA), and calculates the rotational speed Nj(CA) for determination. However, the crank angle at which the rotational speed Nj(CA) for determination is calculated is not limited, and therefore, the resonance influence component Nden(CA) and the rotational speed Nj(CA) may be calculated every 10 degrees or 5 degrees of rotation of the crankshaft.

In the misfire determination device for an internal combustion engine mounted on the hybrid car 20 of the embodiment, the occurrence of a misfire in the engine 22 is determined by determining the 30-degree rotation time T30(CA) from the rotational speed Nj(CA) for determination, calculating the time difference TD30, which is the difference between the 30-degree rotation time T30(ATDC30) at the point 30 degrees after the top dead center of a compression stroke of the cylinder that is the subject of the misfire determination (ATDC30) and T30(ATDC90) at the point 90 degrees after the same top dead center (ATDC90), and calculating the determining value J30, which is the difference in the time differences TD30, the latter of which is calculated 360 degrees after the point at which the former is calculated. However, other calculation methods may be used to determine the occurrence of a misfire in the engine 22 as long as the occurrence of a misfire in the engine 22 is determined using the rotational speed Nj(CA) for determination.

Although, in the misfire determination device for an internal combustion engine mounted on the hybrid car 20 of the embodiment, the occurrence of a misfire in one of the cylinders of the 8-cylinder engine 22 is determined, the number of cylinders is not limited as long as the device determines the occurrence of a misfire in one of the cylinders of a multi-cylinder engine, that is, for example, the occurrence of a misfire in one of the cylinders of a 6-cylinder engine is determined, or the occurrence of a misfire in one of the cylinders of a 4-cylinder engine is determined.

Although, in the misfire determination device for an internal combustion engine mounted on the hybrid car 20 of the embodiment, the occurrence of a misfire in the engine 22 in a system in which the motor MG2 is connected to the ring gear shaft 32a through the speed reduction gear 35 is determined, the occurrence of a misfire in the engine 22 in a system in which the motor MG2 is connected to the ring gear shaft 32a through a transmission instead of the speed reduction gear 35 may be determined. Alternatively, the occurrence of a misfire in the engine 22 in a system in which the motor MG2 is directly connected to the ring gear shaft 32a without the speed reduction gear 35 or the transmission interposed therebetween may be determined.

Figure 13:
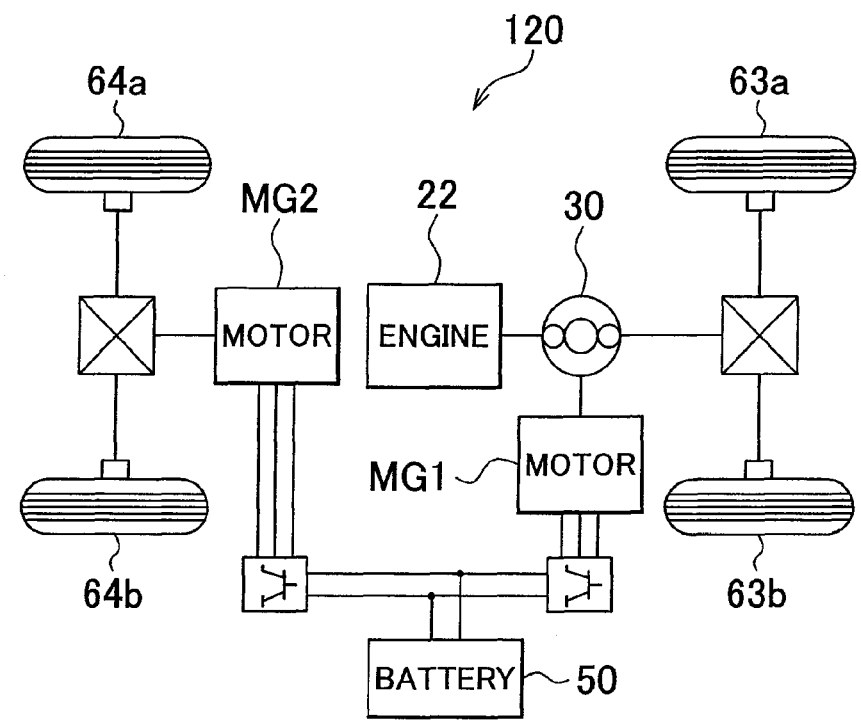
FIG. 13 is a configuration diagram showing an outline of a configuration of a hybrid car 120 according to a modification of the embodiment of the invention.
Figure 14:
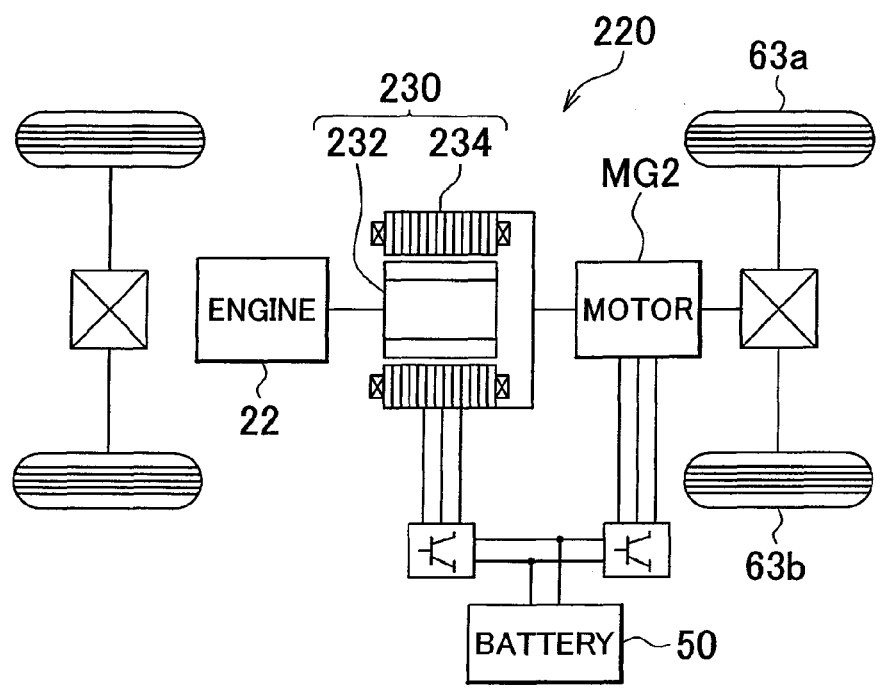
FIG. 14 is a configuration diagram showing an outline of a configuration of a hybrid car 220 according to a modification of the embodiment of the invention.

The misfire determination device for an internal combustion engine mounted on the hybrid car 20 of the embodiment determines the occurrence of a misfire in the engine 22 of the vehicle provided with the power distribution/integration mechanism 30 and the motor MG2, the power distribution/integration mechanism 30 connected to the crankshaft 26 of the engine 22 through the damper 28, which serves as a torsion element, and connected to the ring gear shaft 32a and the rotary shaft of the motor MG1, the motor MG2 connected to the ring gear shaft 32a through the speed reduction gear 35. However, the invention is applicable when the crankshaft of the engine is connected to the downstream side through the damper, which serves as a torsion element. Thus, the occurrence of a misfire in the engine 22 in a system in which the mechanical power from the motor MG2 is transmitted to the axle (the axle connected to wheels 64a, 64b in FIG. 13) different from the axle (the axle connected to the wheels 63a, 63b) to which the ring gear shaft 32a is connected, as illustrated by a hybrid car 120 of a modification shown in FIG. 13, may be determined. Alternatively, as illustrated by a hybrid car 220 of a modification shown in FIG. 14, the engine 22, in which the occurrence of a misfire is determined, may be provided with a double-rotor generator 230 that has an inner rotor 232 connected to the crankshaft 26 of the engine 22 through the damper 28 and an outer rotor 234 connected to the axle side on which the mechanical power is output to the driving wheels 63a, 63b, and that transmits part of the mechanical power from the engine 22 to the axle side and converts the remaining mechanical power into electric power. In this case, the motor MG2 may be connected to the axle side through the speed reduction gear 35 or the transmission, or may be connected to the axle side without the speed reduction gear 35 or the transmission interposed therebetween.

Relations between the main components of the embodiments and the main elements of the inventions described in the "SUMMARY OF THE INVENTION" section will now be described. In the embodiment, the crank position sensor 140 that detects the rotational position of the crankshaft 26 and the engine ECU 24 that calculates, as the rotational speed Ne of the engine 22, the rotational speed during each 30-degree rotation of the crankshaft 26 based on the shaped waves received from the crank position sensor 140 are an example of the "output-shaft rotational-speed detection portion". The rotational position detection sensors 43, 44 that detect the rotational positions of the rotors of the motors MG1, MG2, the motor ECU 40 that calculates the rotational speeds Nm1, Nm2 of the motors MG1, MG2 based on the signals from the rotational speed detection sensors 43, 44, and the hybrid ECU 70 that calculates the downstream-of-damper rotational speed Nd, which is the rotational speed of the carrier shaft 34a (an example of the downstream shaft) downstream of the damper 28 based on the rotational speeds Nm1, Nm2 of the motors MG1, MG2 are an example of the "downstream shaft rotational-speed detection portion". An example of the "resonance-influence component calculation portion" is the engine ECU 24 that performs the steps of S200 to S240 shown in FIG. 4 in which: the engine ECU 24 calculates the after-filtering rotational speeds FNe, FNd that are obtained by extracting the resonance frequency components caused by torsion of the damper 28 from the rotational speed Ne of the engine 22 and the downstream-of-damper rotational speed Nd with the use of the band-pass filter; the engine ECU 24 performs the communication-delay-time estimation process shown in FIG. 6 in which the delay time Td due to communication performed until the downstream-of-damper rotational speed Nd is received by the engine ECU 24 via communication is estimated based on the phase difference between the calculated after-filtering rotational speeds FNe, FNd and on the rotational speed Ne of the engine 22; the engine ECU 24 acquires the rotational speed Ne of the engine 22 and the downstream-of-damper rotational speed Nd that is received the estimated communication delay time Td in advance of when the rotational speed Ne of the engine 22 is received; the engine ECU 24 calculates the torsion angle θb of the damper 28 according to the equation (2) using the acquired rotational speed Ne of the engine 22 and downstream-of-damper rotational speed Nd; the engine ECU 24 calculates the noise-containing resonance influence component Nden(CA) containing low-frequency noise as the influence of resonance of the damper 28 on the rotational speed of the engine 22 using a constant ratio (K/J) that is the ratio between the spring constant K of the damper 28 and a moment of inertia J on the engine 22 side of the damper 28 and the torsion angle θd; and the engine ECU 24 calculates the resonance influence component Nde(CA) by eliminating low-frequency noise with the use of a high-pass filter. An example of the "misfire determination portion" is the engine ECU 24 that performs the process of S250 shown in FIG. 4, in which the rotational speed Nj(CA) for determination is calculated by subtracting the resonance influence component Nde(CA) from the rotational speed Ne(CA) of the engine 22, and that also performs the misfire determination process shown in FIG. 3 in which the occurrence of a misfire in the engine 22 is determined using the rotational speed Nj(CA) for determination. The motor MG2 that outputs power to the carrier shaft 34a side downstream of the damper 28, that is, the downstream ring gear shaft 32a, through the speed reduction gear 35 is an example of the "electric motor". The power distribution/integration mechanism 30 connected to the carrier shaft 34a downstream of the damper 28 and to the axle-side ring gear shaft 32a and the motor MG1 connected to the sun gear 31 of the power distribution/integration mechanism 30 are an example of the "electric power/mechanical power input/output device". The relations between the main components of the embodiments and the main elements of the inventions described in the "SUMMARY OF THE INVENTION" section do not limit the elements of the inventions described in the "SUMMARY OF THE INVENTION" section because the embodiments are an example for specifically describing a mode for carrying out the inventions described in the "SUMMARY OF THE INVENTION" section.

Although the embodiment has been described as the misfire determination device for an internal combustion engine mounted on the hybrid car 20, the invention may be applied to the misfire determination device for an internal combustion engine mounted on a car that includes neither a vehicle-driving electric motor nor an electric generator. The invention may be applied to the misfire determination device for an internal combustion engine mounted on a vehicle other than automobiles, or a mobile object, such as a boat and ship, or an aircraft, and may also be applied to the misfire determination device for an internal combustion engine installed in a fixed facility.

"When at least one of the output shaft rotational speed and the downstream shaft rotational speed is acquired via communication" in the invention includes, in addition to "when the output shaft rotational speed is directly acquired without communication, and the downstream-of-damper rotational speed is acquired via communication", "when the output shaft rotational speed is acquired via communication, and the downstream-of-damper rotational speed is directly acquired without communication", and "when the output shaft rotational speed is acquired via communication, and the downstream-of-damper rotational speed is also acquired via communication". In the latter case, the communication delay time corresponds to the difference in communication delay times. The combustion conditions in the internal combustion engine in the invention include the timing of ignition by the ignition device capable of performing ignitions independently in each of cylinders of the internal combustion engine.

While modes for carrying out the invention have been described using the embodiment, the invention is not limited to such an embodiment at all, and the invention can be implemented in various forms without departing from the spirit and scope of the invention.

What is claimed is:

1. An internal-combustion-engine misfire determination device for determining an occurrence of a misfire in an internal combustion engine having a plurality of cylinders, of which an output shaft is connected, through a torsion element, to a downstream shaft downstream of the torsion element, the misfire determination device comprising:
   an output-shaft rotational speed detection portion for detecting an output shaft rotational speed that is the rotational speed of the output shaft;
   a downstream shaft rotational speed detection portion for detecting a downstream shaft rotational speed that is the rotational speed of the downstream shaft;
   a resonance influence component calculation portion that is configured to acquire the detected output shaft rotational speed and the detected downstream shaft rotational speed, and that calculates a resonance influence component that is the component caused by an influence of resonance due to torsion of the torsion element on the output shaft rotational speed, based on the detected output shaft rotational speed and the detected downstream shaft rotational speed; and
   a misfire determination portion for determining the occurrence of the misfire in the internal combustion engine based on a rotational speed for determination that is obtained by subtracting the calculated resonance influence component from the detected output shaft rotational speed.

2. The internal-combustion-engine misfire determination device according to claim 1, wherein the resonance influence component calculation portion performs at least one of acquisition of the detected output shaft rotational speed and acquisition of the detected downstream shaft rotational speed via communication, extracts a frequency component caused by the resonance from the acquired output shaft rotational speed, and a frequency component caused by the resonance from the acquired downstream shaft rotational speed, estimates a delay time due to the communication based on a phase difference between the extracted frequency components and the acquired output shaft rotational speed, performs the acquisitions of the output shaft rotational speed and the downstream shaft rotational speed between which a time interval corresponding to the estimated delay time due to the communication is interposed, and calculates the resonance influence component caused by the influence of the resonance on the output shaft rotational speed, based on the output shaft rotational speed and the downstream shaft rotational speed of which the acquisitions are performed with the time interval interposed therebetween.

3. The internal-combustion-engine misfire determination device according to claim 2, wherein the resonance influence component calculation portion extracts, as the frequency component caused by the resonance, a frequency component whose frequency is once per two rotations of the output shaft of the internal combustion engine.

4. The internal-combustion-engine misfire determination device according to claim 2, wherein the resonance influence component calculation portion extracts the frequency component, caused by the resonance, by applying a filtering process that does not attenuate the frequency component caused by the resonance but attenuates bands other than the resonance frequency.

5. The internal-combustion-engine misfire determination device according to claim 4, wherein the filtering process is a process using a band-pass filter.

6. The internal-combustion-engine misfire determination device according to claim 2, wherein the resonance influence component calculation portion estimates the delay time due to the communication based on an after-smoothing phase difference obtained by smoothing the phase difference between both the extracted frequency components.

7. The internal-combustion-engine misfire determination device according to claim 2, wherein:
the downstream shaft rotational speed detection portion outputs the calculated downstream shaft rotational speed to the resonance influence component calculation portion via communication; and
the resonance influence component calculation portion directly acquires the output shaft rotational speed detected by the output shaft rotational speed detection portion without the communication, and acquires the downstream shaft rotational speed detected by the downstream shaft rotational speed detection portion via the communication.

8. The internal-combustion-engine misfire determination device according to claim 7, wherein the resonance influence component calculation portion estimates the delay time due to the communication in such a manner that the delay time is estimated to be longer as timing of ignition by an ignition device capable of performing ignitions independently in each of cylinders of the internal combustion engine is retarded.

9. The internal-combustion-engine misfire determination device according to claim 2, wherein the resonance influence component calculation portion estimates the delay time due to the communication based on combustion conditions in the internal combustion engine.

10. The internal-combustion-engine misfire determination device according to claim 2, wherein the resonance influence component calculation portion calculates a torsion angle of the torsion element based on the acquired output shaft rotational speed and the acquired downstream shaft rotational speed, and calculates the resonance influence component based on the calculated torsion angle, a spring constant of the torsion element, and a moment of inertia on the internal combustion engine side of the torsion element.

11. The internal-combustion-engine misfire determination device according to claim 10, wherein the resonance influence component calculation portion calculates the torsion angle by integrating a value obtained by subtracting the acquired downstream shaft rotational speed from the acquired output shaft rotational speed, and calculates the resonance influence component by integrating a product of the torsion angle and a constant ratio between the spring constant and the moment of inertia.

12. A vehicle comprising:
a multi-cylinder internal combustion engine of which an output shaft is connected, through a torsion element, to a downstream shaft downstream of the torsion element; and
the internal-combustion-engine misfire determination device for determining the occurrence of the misfire in the internal combustion engine according to claim 1.

13. The vehicle according to claim 12, further comprising an electric motor that outputs mechanical power to the downstream shaft side downstream of the torsion element,
wherein the downstream shaft rotational speed detection portion detects an electric motor rotational speed that is the rotational speed of the electric motor, and converts the detected electric motor rotational speed to obtain the downstream shaft rotational speed.

14. The vehicle according to claim 13, further comprising an electric power/mechanical power input/output device that is connected to the downstream shaft and an axle and that receives and outputs mechanical power from and to the downstream shaft and the axle side, which involves input and output of electric power and mechanical power to and from the electric power/mechanical power input/output device,
wherein:
the electric motor is connected to the axle side so as to be able to output mechanical power to the axle side; and
the downstream shaft rotational speed detection portion detects a drive state in which the electric power/mechanical power input/output device is driven, and performs a calculation based on the detected electric motor rotational speed and the detected drive state to obtain the downstream shaft rotational speed.

15. An internal-combustion-engine misfire determination device for determining an occurrence of a misfire in an internal combustion engine having a plurality of cylinders, of which an output shaft is connected, through a torsion element, to a downstream shaft downstream of the torsion element, the misfire determination device comprising:
output-shaft rotational speed detection means for detecting an output shaft rotational speed that is the rotational speed of the output shaft;
downstream shaft rotational speed detection means for detecting a downstream shaft rotational speed that is the rotational speed of the downstream shaft;
resonance influence component calculation means for performing at least one of acquisition of the detected output shaft rotational speed and acquisition of the detected downstream shaft rotational speed via communication, extracting a frequency component caused by resonance due to torsion of the torsion element from the acquired output shaft rotational speed, and a frequency component caused by the resonance from the acquired downstream shaft rotational speed, estimating a delay time due to the communication based on a phase difference between the extracted frequency components and the acquired output shaft rotational speed, performing the acquisitions of the output shaft rotational speed and the downstream shaft rotational speed between which a time interval corresponding to the estimated delay time due to the communication is interposed, and calculating the resonance influence component caused by the influence of the resonance on the output shaft rotational speed, based on the acquired output shaft rotational speed and the acquired downstream shaft rotational speed; and misfire determination means for determining the occurrence of the misfire in the internal combustion engine based on a rotational speed for determination that is obtained by subtracting the calculated resonance influence component from the detected output shaft rotational speed.

16. An internal-combustion-engine misfire determination device for determining an occurrence of a misfire in an internal combustion engine having a plurality of cylinders, of which an output shaft is connected, through a torsion element, to a downstream shaft downstream of the torsion element, the misfire determination device comprising:

detecting an output shaft rotational speed that is the rotational speed of the output shaft;

detecting a downstream shaft rotational speed that is the rotational speed of the downstream shaft;

calculating a resonance influence component that is the component caused by an influence of resonance due to torsion of the torsion element on the output shaft rotational speed, based on the detected output shaft rotational speed and the detected downstream shaft rotational speed; and determining the occurrence of the misfire in the internal combustion engine based on a rotational speed for determination that is obtained by subtracting the calculated resonance influence component from the detected output shaft rotational speed.

17. The internal-combustion-engine misfire determination method according to claim 16, further comprising:

acquiring the detected output shaft rotational speed and the detected downstream shaft rotational speed via communication;

extracting a frequency component caused by the resonance from the acquired output shaft rotational speed;

extracting a frequency component caused by the resonance from the acquired downstream shaft rotational speed;

estimating a delay time due to the communication based on a phase difference between the extracted frequency components and the acquired output shaft rotational speed;

performing acquisition of the output shaft rotational speed and acquisition of the downstream shaft rotational speed between which a time interval corresponding to the estimated delay time due to the communication is interposed; and calculating the resonance influence component that is the component caused by the influence of the resonance on the output shaft rotational speed, based on the output shaft rotational speed and the downstream shaft rotational speed of which the acquisitions are performed with the time interval interposed therebetween.

* * * * *